US006952396B1

United States Patent
Cottreau et al.

(10) Patent No.: US 6,952,396 B1
(45) Date of Patent: Oct. 4, 2005

(54) ENHANCED DUAL COUNTER ROTATING RING NETWORK CONTROL SYSTEM

(75) Inventors: Peter Martin Kenneth Cottreau, Ashton (CA); David MacDonald Delaney, Ottawa (CA); Alan Hurren, Nepean (CA); Wang-Hsin Peng, Ottawa (CA); Mark Cobbold, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/405,094

(22) Filed: Sep. 27, 1999

(51) Int. Cl.[7] .............................. H04J 1/16; H04J 3/14
(52) U.S. Cl. ...................... 370/222; 370/238; 370/255; 370/352; 370/353; 455/445; 714/4
(58) Field of Search ................................ 370/238, 352, 370/353, 216, 221–224, 254–255, 241–242, 249, 228, 258, 538, 907, 909, 225; 455/445; 714/4

(56) References Cited

U.S. PATENT DOCUMENTS

| | | | | |
|---|---|---|---|---|
| 5,490,252 A | * | 2/1996 | Macera et al. .............. 709/249 |
| 5,633,861 A | | 5/1997 | Hanson et al. .............. 370/232 |
| 5,636,205 A | | 6/1997 | Suzuki et al. ............... 370/224 |
| 5,663,950 A | * | 9/1997 | Lee et al. ................... 370/224 |
| 5,748,901 A | | 5/1998 | Afek et al. ............. 395/200.68 |
| 5,764,392 A | | 6/1998 | Van As et al. .............. 359/124 |
| 6,222,848 B1 | * | 4/2001 | Hayward et al. ........... 370/412 |
| 6,650,646 B1 | * | 11/2003 | Galway et al. ............. 370/397 |
| 6,714,517 B1 | * | 3/2004 | Fawaz et al. ............... 370/236 |

OTHER PUBLICATIONS

Grover, W.D.: "High Availability Path Design in RingBased Optical Networks", IEEE, vol. 7, No. 4, Aug. 1999.
Gerstel O. et al.: "Combined WDM and SONET Network Design", IEEE, Mar. 21, 1999.

* cited by examiner

Primary Examiner—Dang Ton
Assistant Examiner—Inder Pal Mehra
(74) Attorney, Agent, or Firm—Max R. Wood; Ogilvy Renault, LLP

(57) ABSTRACT

A control system enables transport of payload data across a dual counter rotating ring (DCRR) network having two or more nodes, each node providing access to the DCRR network by a respective local area network (LAN) subtending the node. The control system comprises a topology learning entity operative within each node for monitoring individual, links of the DCRR, discovering the active topology of the DCRR, communicating topology changes to other nodes in the DCRR, and informing frame forwarding and learning processes of the topology to enable failover to redundant resource upon detection of a network component failure. A frame forwarding process selects a shortest path route between a source and a destination node in the DCRR, and forwards frames to the destination node via the selected shortest path route. An address learning process inspects a source medium access control (MAC) address in each received frame to learn a shortest path route for each MAC address.

53 Claims, 10 Drawing Sheets

DCRR ACCESS POINT

FIGURE 11

| Name | Value | Description |
|---|---|---|
| Tlpim | 200us | the maximum time between transmission of LPIMs. |
| Tsingle-connection | 2ms | the maximum time spent waiting for the second connection before starting topology discovery. |
| Nlpim_operational | 3 | the number of consecutive LPIMs which must be received before declaring a link operational. |
| Nlpim_debounce | 5 | the number of LPIMs which must be missed before assuming link failure. |
| Nlpim_recovery | 10 | the number of consecutive LPIMs which must be received before declaring a link as recovered from failure. |
| Tlfm_to | 200ms | the maximum time an AP 12 will spend waiting for the other end of a failed link to transmit its LFMs. |
| Tlrm_to | 200ms | the maximum time an AP 12 will spend waiting for the other end of a failed link to transmit its LRMs. |
| Ttd_to | 200ms | the maximum time an AP 12 will wait for a TDM before declaring a linear topology. |
| Tlrm_hysteresis_to | 200ms | the minimum time an AP 12 will allow for a link to settle between the time of transmission of a LRM to the earliest possible transmission of the next LFM. |
| Tlfm_hysteresis_to | 200ms | the minimum time an AP 12 will allow for a link to settle between the time of transmission of a LFM to the earliest possible transmission of the next LRM. |

ENHANCED DUAL COUNTER ROTATING RING NETWORK CONTROL SYSTEM

TECHNICAL FIELD

The present invention relates generally to dual ring Synchronous Optical Network (SONET) Wide Area Networks (WANs) or Municipal Area Networks (MANs), and in particular to a control system enabling dual counter rotating ring (DCRR) functionality in a dual ring WAN or MAN, and to a WAN or MAN implementing the control system.

BACKGROUND OF THE INVENTION

The Synchronous Optical Network (SONET) is the transport technology of choice for high bandwidth communication across a Wide Area Network (WAN). The SONET standard defines a multiplexing hierarchy for digital communications, including transmission rates, signals and interfaces for fibre optic transmission. SONET also provides a standard synchronous optical transmission protocol. The broadband fibre network it supports is formed by a family of network elements conforming to the SONET interface requirements.

The SONET protocol implements communication signals which are multiplexed in increments of approximately 51.8 Mbps. The 51.8 Mbps service is the finest granularity SONET service and is referred to as STS-1. Higher bandwidth SONET services are in integer multiples of STS-1. The most popular are STS-3 (155 Mbps), STS-12 (622 Mbps), STS-48 (2.48 Gbps), STS-192 (10 Gbps). In the optical domain these services are referred to as OC-3, OC-12, OC-48 and OC-192 respectively.

SONET communication signals are channelized. Under management control, a SONET STS-1 stream can be time divided into payload channels of down to DS0 (64 Kbps) granularity. Multiple DS0 channels can be concatenated to enable the carriage of higher bandwidth service such as T1 or T3. All channels in a SONET stream can be concatenated to enable the carriage of continuous data up to a rate equal to the rate of the SONET stream (less SONET transmission overhead). A 155 Mbps SONET stream concatenated in such a way is referred to as OC-3c. Concatenated streams may be multiplexed into higher rate SONET streams. For instance an OC-12 stream may be composed of four OC-3c streams.

The most widely deployed SONET topology is a dual ring linking a number of network elements (NEs). Each ring is composed of point-to-point links with adjacent (link partner) NEs in the ring. On a SONET ring, a service is provisioned as a bi-directional communication channel between two NEs on the ring. The communication channel can consist of, for example, a single DS0. In this case the NE performs an add/drop multiplexing function on this channel, receiving the data in the channel from the ring (drop) and replacing this data with the data to be transmitted to the link partner NE for this channel (add). The ring bandwidth allocation is static, in that a channel allocated to communication between two NEs cannot be used for any other purpose.

The dual ring topology is employed for media redundancy purposes. There are two widely deployed redundancy mechanisms: Unidirectional Path Switched Ring (UPSR); and Bi-directional Line Switched Ring (BLSR). In UPSR a transmitting NE puts a copy of the data on each of the rings and the receiving NE chooses which signal to receive. In BLSR all NEs use one of the rings for payload transport, leaving the other ring for redundancy. If the payload-carrying ring is broken, the NEs switch to the other "redundant" ring for continued payload transport.

Dense Wavelength Division Multiplexing (DWDM) is an enhancement of the SONET service, which uses optical techniques to put multiple streams onto a single fiber. Each stream on the fiber uses a different wavelength. This technique enables a significant increase in the bandwidth available using existing fibre links. Thus DWDM is particularly useful on congested fiber links, because it is frequently more cost-effective to invest in equipment to increase the throughput of the existing infrastructure rather than laying new fiber runs. DWDM can be readily implemented on existing SONET rings, including UPSR and BLSR topologies, by use of appropriate Layer 1 hardware/firmware in the NEs. Thus it is expected that logical ring WAN topologies (e.g. BLSR) will be popular for DWDM networks for the same reasons as SONET: redundancy and Metropolitan Area Network (MAN) fiber routing simplicity.

A Dual Counter Rotating Ring (DCRR), such as, for example, a Fiber Distributed Data Interface (FDDI) network, is a further enhancement of the SONET service, in which all payload traffic flows in one direction around one ring (the "payload ring"). Payload data frames are STRIPed by the sending node when they complete a round trip. In the event of a failure of a network component (e.g. a link on the payload ring, or a node) the nodes on opposite sides of the break redirect traffic onto the redundant ring, in which the traffic flows in the direction opposite that of the payload ring, to thereby close the ring.

The above-described existing WAN infrastructures are effective in permitting reliable communications for high bandwidth applications. However, there are a number of deficiencies of those prior art systems which limit utilisation of the bandwidth capacity of the installed fiber media. In particular, the SONET protocol prescribes static allocation of ring bandwidth, so that a channel allocated to communication between two NEs cannot be used for any other purpose, even if that channel is idle (i.e. is not carrying payload traffic). Additionally, one of the rings is effectively redundant, so that when the WAN is fully operational (which is the majority of the time) only half of the total bandwidth capacity is actually used for payload traffic. Finally, in the event of a failure of a network component (e.g. a link or an NE), all of the operational NEs on the WAN must be informed of the existence of the failure, and then must switch over to the redundant ring. As the number of NEs on the WAN increases, the time required to accomplish this operation (the "fail-over time") also increases.

Accordingly, there remains a need for a network control system, usable in conjunction with dual-ring SONET topologies, which permits a more efficient utilisation of the total bandwidth capacity of the installed fiber media.

OBJECTS OF THE INVENTION

It is therefore an object of the present invention to provide a network control system which permits both rings of a dual ring WAN to be used for payload traffic.

It is a further object of the present invention to provide a network control system in which ring bandwidth is dynamically allocated.

It is a further object of the present invention to provide a network control system in which the NE's independently monitor the network topology to detect and respond to network component failure events.

It is a further object of the present invention to provide a network control, system which facilitates Layer 2 interconnect over dual ring WAN infrastructure.

It is a further object of the present invention to provide a network control system which facilitates network failure detection and response at Layer 2.

It is a further object of the present invention to provide a network control system which facilitates spatial reuse of shared network bandwidth.

It is a further object of the present invention to provide a network control system which enables opportunistic burst access by any single node in a shared network topology without sacrifice of fair access by other nodes in the network.

Accordingly, an aspect of the present invention provides a control system for a dual counter rotating ring (DCRR) network having two or more nodes, each node providing access to the DCRR network by a respective local area network (LAN) subtending the node, the control system comprising: a topology learning entity operative within each node for monitoring individual links of the DCRR, discovering the active topology of the DCRR, communicating topology changes to other nodes in the DCRR, and informing frame forwarding and learning processes of the topology to enable failover to a redundant resource upon detection of a network Component failure; a frame forwarding process for selecting a shortest path route between a source and a destination node in the DCRR, and for forwarding frames to the destination node via the selected shortest path route; and an address learning process for inspecting a source medium access control (MAC) address in each received frame to learn a shortest path route for each MAC address.

A further aspect of the present invention provides a method of controlling a dual counter rotating ring (DCRR) network having two or more nodes, each node providing access to the DCRR network by a respective local area network (LAN) subtending the node, the method comprising the steps of: monitoring individual links of the DCRR by sending and receiving link path integrity messages, the link path integrity messages being sent to downstream link partner nodes and received from upstream link partner nodes, the monitored links being the links on which link path integrity messages are received at each node in the DCRR; discovering an active topology of the network by periodically entering an active topology discovery state in which topology discovery messages are sent on the ring and topology discovery message responses are received; communicating changes in the active topology due to failure of monitored links to other nodes in the network; and informing forwarding and learning processes within each node of the active topology to enable failover of communications to a redundant resource.

A still further aspect of the invention provides a method of enabling shortest-path route forwarding of payload data across a communication network which includes two or more access points connected by dual-path links, comprising a pair of link paths adapted to carry payload traffic in a direction opposite that of the other link path, each access point having a pair of WAN ports adapted for connection to respective dual path links, the method comprising the steps of: discovering a topology of the communication network; learning addresses of destination devices subtended from the communication network; determining a path offering a shortest route, in terms of the number of hops to each learned address; and enabling a frame forwarding process to forward payload data across the communication network via the determined path offering the shortest route.

The control system of the present invention provides a suite of Dual Counter Rotating Ring (DCRR) services on a dual ring SONET topology. For the purposes of the present application, the control system of the present invention is referred to simply as "DCRR", while a network (WAN or MAN) operating under the control system of the present invention is referred to as a "DCRR network".

DCRR provides level 2 control functionality which operates independently of level 1 (e.g. physical transport layer) technology. In accordance with the present invention, both rings are used for payload traffic: the data flowing in one direction in one ring, and in the opposite direction in the other ring. Payload traffic can thus be forwarded to its destination node on the ring offering the shortest route path, in terms of the number of hops, between source and destination nodes. Payload data frames are STRIPped at the destination node, thereby freeing bandwidth for other data traffic.

DCRR offers the following benefits over prior art connection-oriented SONET service:

Burst availability—DCRR provides opportunistic burst capability by any node, up to the bandwidth of the WAN or MAN connection, when the network is not congested.

Bandwidth efficiency—DCRR substantially doubles the usable bandwidth (relative to prior art network topologies) without sacrifice of redundancy by using the conventionally redundant ring for payload traffic when the network is fully operational. In the event of a failure of a network component (e.g. a node or a link path), the resulting network topology is discovered and payload traffic dynamically re-routed via the shortest route path given the new topology.

Spatial reuse—payload data frames are STRIPped by the receiving node enabling the reuse of the bandwidth occupied by the frame.

Statistical gain—DCRR provides a shared Layer 2 medium for multi-drop interconnect.

DCRR is specifically targeted for a dual ring WAN (MAN) topology. However, while providing an optimal solution for the dual ring topology, DCRR does not preclude support for dual link path linear and point-to-point topologies. These topology alternatives are accommodated as special cases of the dual ring topology.

BRIEF DESCRIPTION OF THE DRAWINGS

The invention will now be described by way of example only, and with reference to the accompanying drawings, in which:

FIG. 11 is a table showing exemplary constants usable in the present invention.

DETAILED DESCRIPTION OF THE PREFERRED EMBODIMENT

The present invention provides a control system enabling a dual counter rotating ring (DCRR) network functionality employing conventional dual ring SONET transport media. The invention provides layer 2 services, which operate independently of layer 1, so that applications communicating over the WAN (MAN) can be shielded from the underlying physical transport layer technology. Additionally, a conventional SONET UPSR or BLSR network (including DWDM) can be readily converted into a DCRR network because the layer 2 functionality of the present invention either replaces or does not conflict with legacy layer 1 failover functionality.

Figure 1A:
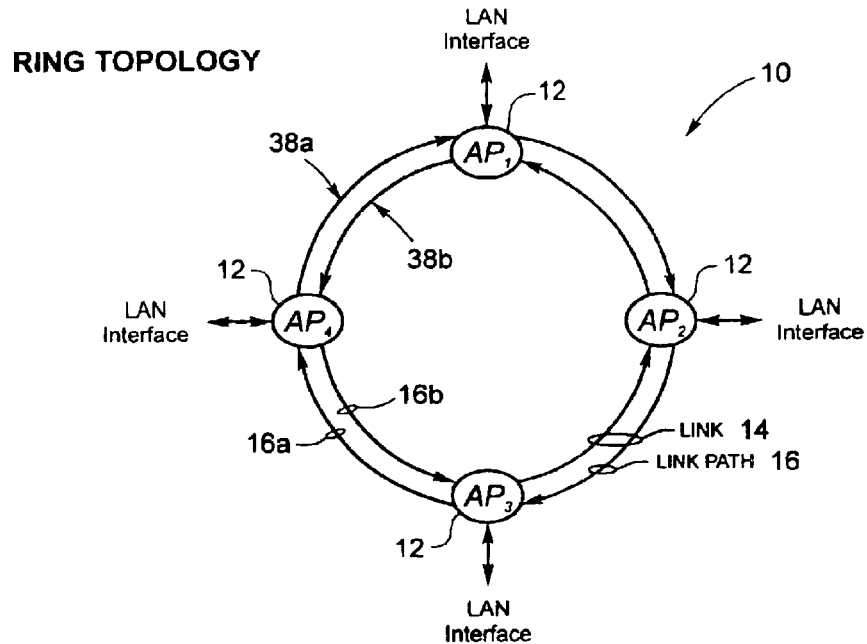
FIGS. 1a–1c inclusive show respective network topologies supportable by the DCRR in accordance with the present invention.
Figure 2:
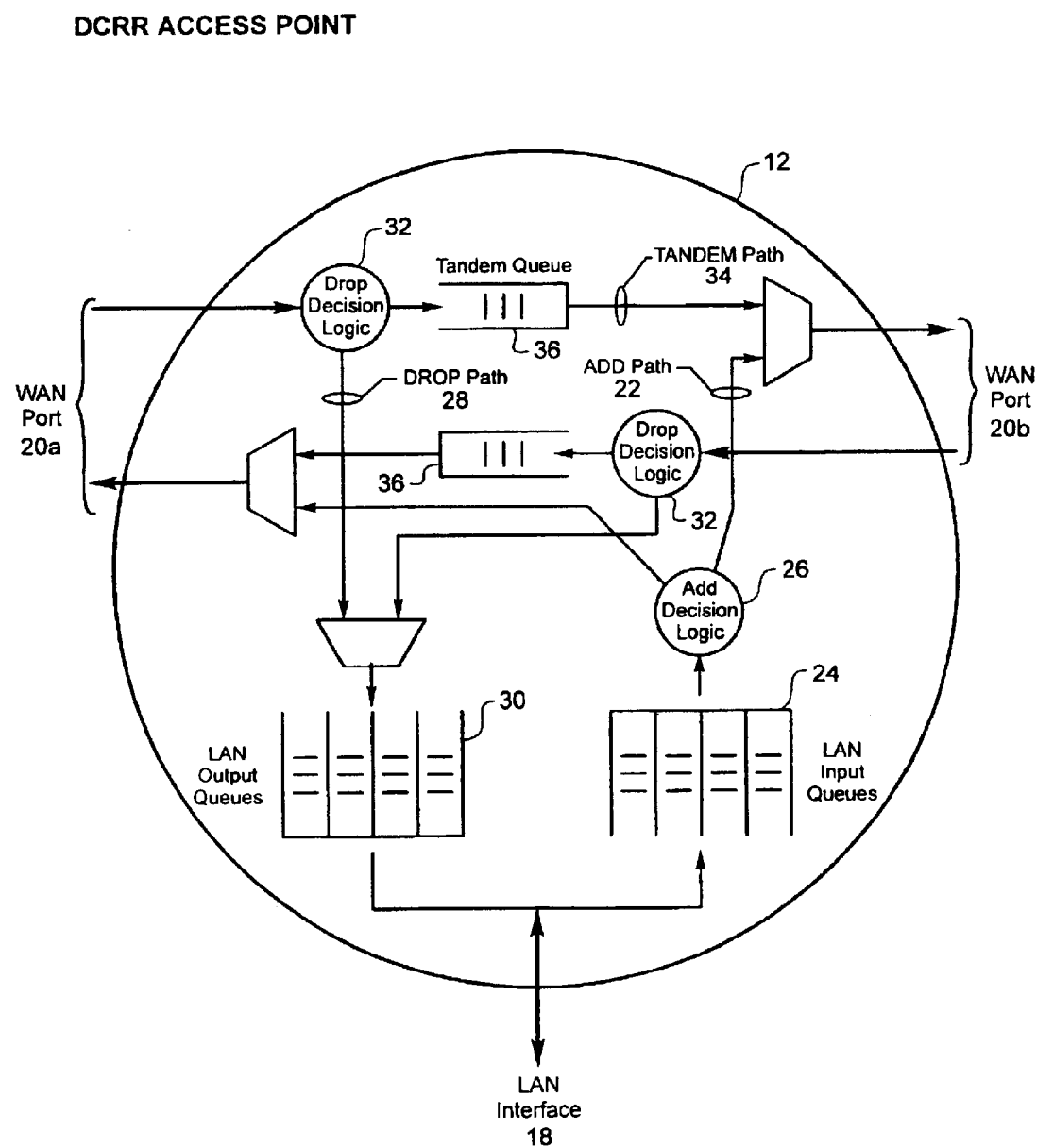
FIG. 2 is a schematic illustration of an access point operative in conjunction with a DCRR network according to the present invention.

Referring to FIG. 1a a DCRR network 10 generally comprises a plurality of access points 12 connected by links 14. Each link comprises a pair of link paths 16, in which payload data traffic flows in opposite directions (as indicated by the arrows). As shown in FIG. 2, each access point (AP) 12 comprises a LAN interface 18 preferably adapted for connection with a medium (not shown), which may be a single workstation or an Ethernet Local Area Network (LAN); and a pair of WAN ports 20 capable of connection to a respective link 14 of the DCRR network 10. As shown in FIG. 2, each WAN port 20 comprises two fibre connections, one for each path 16 of a respective link. In addition, each AP comprises: an ADD path 22 including one or more LAN input queues 24 and ADD decision logic 26 for transmitting payload data received at the LAN interface 18 over one of the link paths 16; a DROP path 28 including one or more LAN Output queues 30 and drop decision logic 32 for receiving payload data destined for the medium and transmitting the payload data over the LAN interface 18; and a TANDEM path 34 including a tandem queue 36 for receiving traffic destined for a medium subtending from a first AP 12 downstream of a second AP 12 and transmitting the traffic over a corresponding downstream link 16.

In order to facilitate a clearer understanding of the present invention, the following description of a preferred embodiment is divided into the following sections:

1. WAN topologies supported by the present invention;
2. An explanation, of nomenclature used in connection with the present invention;
3. An exemplary DCRR frame used to transport payload data across the DCRR network;
4. An overview of exemplary DCRR functionality;
5. A detailed description of the functional components of DCRR according to an embodiment of the present invention;
6. Exemplary walk-throughs of various connection scenarios in a DCRR network; and
7. Exemplary data through-put comparisons between conventional FDDI and SONET networks and a DCRR network.

Topologies Supported by the Present Invention

Figure 1B:
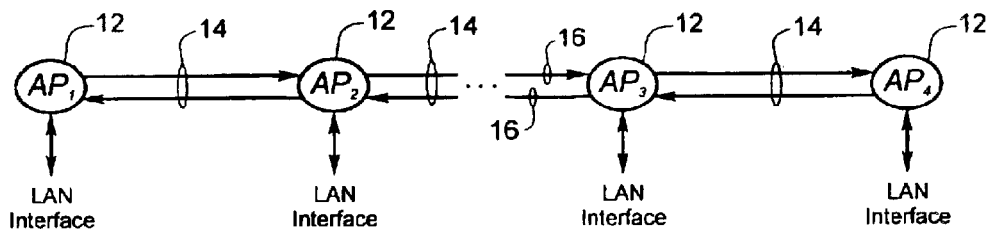
Figure 1C:
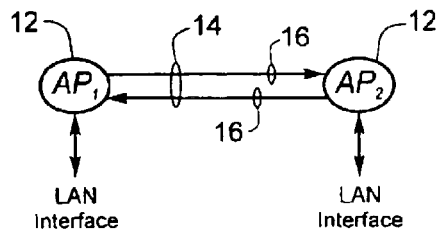

Referring to FIGS. 1a–c, the present invention supports three network topologies: ring, linear and point-to-point. As shown in FIG. 1a, the ring topology comprises a dual ring SONET connecting two or more access points (APs) 12. The link paths 16 of each link 14 co-operate to define a pair of rings 38a, b, each of which carries payload traffic in one direction. The direction of traffic flow in one ring 38a is opposite to that of the other ring 38b.

Referring now to FIGS. 1b and 1c, the linear topology is characterised by three or more APs 12 connected by dual path links 14, while the point-to-point topology employs a single dual path link 14 connecting two APs 12. In each case, each path 16a carries payload traffic in one direction, opposite to that of the other path 16b. As such, for the purposes of the present invention the linear and point-to-point topologies are considered to be special cases of the dual ring topology shown in FIG. 1a: a DCRR in which both rings 38 are open between a common pair of adjacent APs 12.

Nomenclature

APs 12 are preferably numbered such that each AP is uniquely identifiable (see FIG. 1a). An AP 12 sending traffic to APx is referred to as APx's upstream AP. The AP 12 to which traffic is sent from APx is referred to as APx's downstream AP. APs 12 are joined by bi-directional point-to-point connections known as DCRR network links 14 or simply links 14. APs 12 at either end of a single link 14 are referred to as partner APs. Each direction (segment of a ring) in a link 14 is referred to as a link path 16. An AP 12 can be connected to up to two links 14. When referring to one of the links 14 the other link 14 of an AP 12 is referred to as the opposite link 14.

Exemplary DCRR Frame

Figure 3:
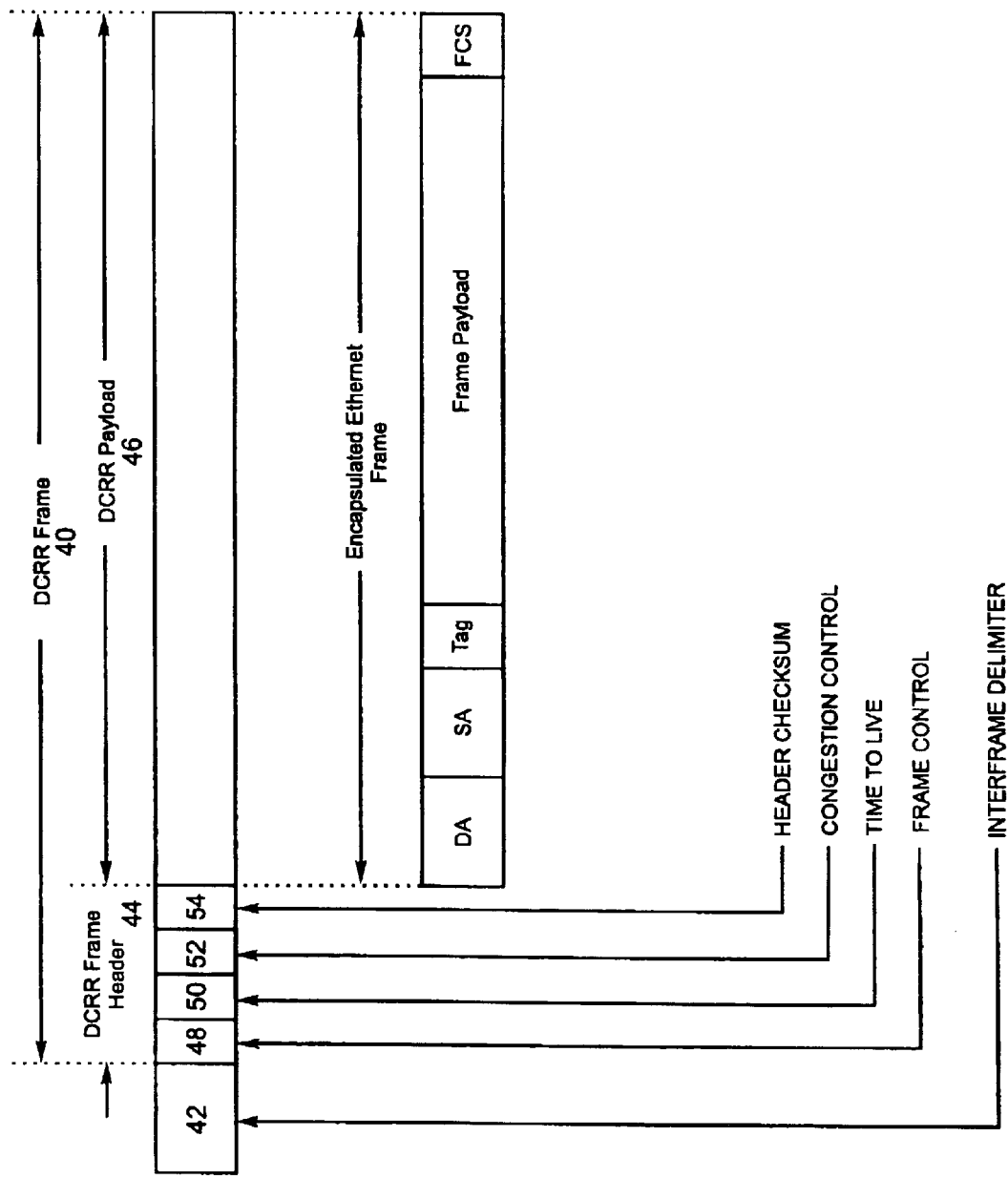
FIG. 3 is a schematic illustration of a frame usable for transporting payload data across a DCRR network in accordance with the present invention.

Referring now to FIG. 3, payload data is transported across the DCRR network 10 encapsulated within a DCRR frame 40. As shown in FIG. 3 the frame 40 comprises an interframe delimiter 42; a DCRR frame header 44; and DCRR payload 46.

The interframe delimiter 42 serves to mark the beginning of a DCRR frame 40. In the illustrated embodiment, the DCRR payload 46 of the DCRR frame 40 comprises an ethernet frame carrying payload data.

The DCRR Frame Header 44 is used to enable frame transport and topology learning functionality of the DCRR. In the illustrated embodiment, the DCRR Frame Header 44 is made up of four (4) eight-bit fields as follows:

A Frame Control 48 field identifying the type of frame and the priority of payload frames. The upper nibble (two bits) identifies the frame type. The lower nibble identifies the frame priority;

A Time To Live (TTL) 50 field set to a constant by the ADD decision logic 26 of the AP 12 which ADDs the frame onto the ring. This field is decremented by the TANDEM path 34 of each successive AP 12 as the frame 40 is TANDEMed. This field is used by address learning logic to help determine the shortest path to a destination AP 12, which ensures that frames do not circulate indefinitely;

A Congestion Notification 52 field used to signal congestion on the DCRR network 10; and A Header Checksum 54 field containing an eight-bit checksum over the DCRR frame header 44 to verify error-free transmission of the frame 40.

Overview of DCRR Functionality

The present invention provides layer 2 functionality which may conveniently be divided into the following operational areas: Topology Learning; Address Learning;

Frame Forwarding; and Datapath Operations. Each of these areas of functionality are described below.

Topology Learning

In accordance with the present invention, each AP 12 includes a Topology Maintenance Protocol (TMP) entity which enables the ADD path 22, DROP path 28 and TANDEM path 34 of the AP 12. The TMP entity discovers and continuously monitors the active topology of the DCRR network 10 in order to enable optimal frame forwarding from a medium subtending from a LAN interface 18 to the DCRR network 10 and to provide fast failover in the event of network component failure. It is a goal of the TMP entity to provide failover times on the order of SONET failover (e.g. approximately 50 ms).

The TMP entity performs the following tasks:

Monitors the individual links 14;

Discovers the active topology of the DCRR network 10;

Communicates changes in the active topology of the DCRR network 10 due to failure of links 14 or link paths 16 to other APs 12; and Informs Forwarding and Learning processes within the AP 12 of the active topology of the DCRR network 10 to enable failover of communication to redundant resources.

Individual links 14 are monitored by point-to-point TMP message communication between partner APs 12. The messages are sent at a rate designed to provide the fastest possible link failure detection without conflicting with Layer 1 protection mechanisms. Failure of links 14 is communicated to all APs such that each AP 12 can modify its perception of the active topology of the DCRR network 10. Based on this perception, each AP 12 alters its forwarding and learning behaviour to be consistent with an optimum behaviour given the active topology.

Address Learning

Each AP 12 maintains an address cache of Media Access Control (MAC) addresses of Ethernet media and devices subtending from the DCRR network 10. The address cache contains: the addresses of locally attached hosts (hosts attached to the LAN interface 18), as well as the addresses of hosts attached to the DCRR network and which communicate with the locally attached hosts. Furthermore, since each remote MAC destination can be reached on either ring 38a, b, the address cache contains the identity of the ring 38 with the shortest path to the remote destination MAC address (i.e. the shortest path route—SPR) and the distance, in hops, to the AP 12 from which the MAC subtends. This later information is derived from the DCRR frame header TTL 44.

Associated with each entry in the address cache is the following forwarding information:

WAN Address: A single bit indicating, when asserted, that the address is subtended from the WAN side. When not asserted it indicates that the address is subtended from the LAN side.

Direction to AP: If the WAN Address bit is asserted, then this single bit field indicates a direction (in the form of a ring number) which is the shortest path to the AP subtending the address. If the WAN Address is not asserted, the field has no meaning.

Direction Forwarding Enabled: If the WAN Address bit is asserted, then this single bit field indicates, when asserted, that the Direction to AP field must be used as the DCRR network forwarding direction. When not asserted, it indicates that a hash direction must be used for the DCRR network forwarding direction.

Ring Hops To AP: If the WAN Address bit is asserted, the field indicates the number of hops to the AP that subtends the address.

The learning of MAC addresses and the address associated information depends on the side (LAN or WAN) on which the address, resides and on the topology of the DCRR network 10.

LAN-side Address Learning

Learning of source addresses subtending from the LAN interface 18 is performed as per IEEE 801.ID(Q). If the source address (source address/fid combination) of a frame 40 received at the LAN interface 18 is not present in the address cache then it is added to the next free entry in the cache if the cache is not full. It overwrites the oldest entry in the cache if the cache is full.

The WAN Address field of the address-associated information for the entry is set to zero. All other fields in the address-associated information are undefined and preferably written to zero by default.

WAN-side Address Learning

Learning of MAC addresses subtending from other APs 12 on the DCRR network 10 is complicated by the need to avoid misordering of frames 40 in a ring topology when a frame transitions from unknown to known in the address cache. This transition is managed by learning the address and the address-associated information independently.

When a new WAN-side address is learned, the address cache may be updated immediately. The address-associated information is set as follows:

WAN Address—Asserted. The address resides on the WAN side.

Direction to AP—Set to a value consistent with the direction from which the frame 40 bearing the source address was received.

Direction Forwarding Enabled—Not asserted. The hash direction must be used as the forwarding direction for frame destined to this address.

Ring Hops To AP—Set to (TTLmax–TTLframe) where TTLmax is the maximum allowed value of the TTL field and TTLframe is the TTL 50 found in the DCRR header 44 of the frame 40.

As such, if the address is known to reside on the WAN side, all relevant information is learned, but the direction of forwarding is not enabled. Frames are still forwarded over the DCRR network 10 hash path for this address but new learning events based on later receptions of this source address are no longer initiated. Before shortest path forwarding can be updated for a WAN-side address the paths 16 must be flushed to avoid frame misordering.

The learning logic flushes the DCRR network paths 16 of a ring 38 by performing a path flush procedure as follows:

1. Disables the ADD path 22 of both WAN ports 20;
2. Sends a path flush message (PFM) over both of the DCRR network links 14 of the AP 12;
3. Starts a timer of duration Tpfm (FIG. 11);
4. Waits for the reception of the PFM at the opposite WAN port 20 or for timer expiry;
5. Asserts a Direction Forwarding Enabled bit in the associated information field of the addresses to be updated; and
6. Re-enables the ADD path 22 of both WAN ports 20.

The format of an exemplary PFM is as follows:

Frame Type: PFM type.

TTL: Time To Live.

Destination Address: MAC address of the AP that originates the LFM onto the ring.

Source Address: MAC address of the AP that originates the LFM onto the ring.

Checksum: Integrity checksum over the message.

Address Ageing

As described above with respect to address learning, the process of ageing addresses is complicated by the need to avoid frame misordering in a case where the shortest path forwarding direction is not the same as the hash direction. Here again, a flush procedure identical to that used for learning is required.

Address Re-learning

As source addresses continue to be received at the LAN interface 18 and WAN ports 20, the associated data is constantly evaluated such that changes in the location of a MAC address may be recorded in the address cache. WAN-side MAC addresses in the address cache must be purged upon topology change. The Topology Maintenance Protocol Entity communicates changes in the active topology (as described in greater detail below) such that purges can be performed.

Frame Forwarding

In order to maximize spatial reuse in the ring topology, frame forwarding logic uses the shortest path between source and destination APs 12, as determined by the TTL field 50 of frames 40 received from the DCRR network 10. All frames 40 destined to a multicast address or to an address not known to the address cache are transmitted over a pseudo-randomly chosen link 14. The pseudo-random function is a hash of the destination and source addresses of the frame 40 to protect against frame misordering.

Forwarding in a linear topology depends on the direction to the destination. All frames 40 destined to a multicast address or to an address not known to the address cache are transmitted over both links 14.

DCRR follows different forwarding policies depending on the active topology of the network and on the nature of the traffic to be forwarded. The DCRR network topology is discovered by the Topology Maintenance Protocol Entity and communicated to the forwarding logic. Valid topologies are ring, and linear (point-to-point is a linear topology). The ring topology can be in one of two states, operational or broken.

Traffic types are "known traffic", and "unknown traffic" based on whether the MAC address is known to the forwarding logic. The means of learning the MAC addresses in the network is described above in the Address Learning section.

The goal of the forwarding logic is to forward frames 40 in such a way as to maximize throughput for a given topology while preserving temporal order of flows, A flow, in the context of the forwarding logic, is characterized by a MAC destination/source address pair. A further refinement of the definition of a flow incorporates the IP destination/source address pair.

Following is a description of exemplary forwarding policies for the various topology and traffic types.

The problems to be solved for transparent bridge forwarding in a spatial re-use ring topology are:

Load sharing the multicast and flood traffic to prevent this traffic from overburdening one of the rings;

Choosing a forwarding direction that is the shortest path to the AP subtending the destination to achieve the maximum spatial re-use;

Choosing a forwarding direction when the ring is broken; and

Performing the above while preventing frame misordering of flows.

Multicast and flood traffic load sharing is achieved by performing a hash over the source and destination addresses of the frame 40. The single bit hash result is then used to specify the direction of forwarding around the rings 38. If the frame 40 carries IP protocol DCRR payload 46, then a further refinement would be to include the IP addresses in the hash calculation. This ensures load sharing between routers and between routers and servers. This approach also prevents frame misordering of flows.

Choosing the shortest path direction for forwarding is achieved by learning the number of hops to a given AP 12 and the direction that yields the smallest number of hops. The number of hops to an AP 12 is determined from the TTL field 50 is the header 44 of DCRR frames 40. This information is stored with the address in the address cache when the address is learned. If a frame 40 is received bearing this address with TTL field 50 indicating a smaller number of hops, then the address cache is updated with this new hop count and new direction.

The direction of traffic flow cannot be changed without ensuring that frame misordering will not occur. Therefore, if the shortest path direction is opposite the flood direction (as determined by the hash algorithm) then some measure must be taken to prevent frame misordering on the path switch. These measures are discussed in the learning section above. In a linear or broken ring topology all floods and multicasts are forwarded over both WAN ports 20. Known unicast addresses are forwarded according to the Direction to AP field in the associated information of the frame destination address.

Datapath Operations

FIG. 2 shows the traffic flow within an AP for various traffic patterns on the DCRR network 10 (note that in this figure the TANDEM queue 36 is represented as a simple FIFO queue for simplicity).

Frames 40 received at the AP LAN interface 18 and destined to an address subtended from another AP 12 on the DCRR network 10 are queued in the LAN Input queues 24 for flow onto one of the rings 38 of the DCRR network 10. This operation is referred to as an ADD operation. As DCRR frames 40 are received at the LAN interface 18 the MAC destination addresses are searched in the address cache. Based upon the results of the search, the frame 40 is forwarded to the appropriate WAN port 20.

In a STRIP operation, a frame 40 received at a WAN port 20 is removed from the ring 38 and discarded. DCRR frames 40 received at an AP 12 on either ring 38 are STRIPped and discarded under any one of the following circumstances:

The DCRR frame TTL 50 is equal to 1; OR

The DCRR frame header checksum 54 verification fails; OR

The DCRR payload 46 (e.g. an Ethernet frame) source address is found in the address cache and resides on a medium connected to the AP's own LAN interface 18.

In a DROP operation, the frame 40 is taken off of the ring 38 and forwarded to the LAN interface 18 via the LAN Output queues 30 for transmission to the local medium. When DCRR frames 40 are received at an AP 12 on either ring 38, the DCRR payload 46 of the DCRR frame 40 is de-capsulated and queued for transmission on the LAN interface 18 if the DCRR frame 40 is not STRIPped and the DCRR payload 46 is destined to the medium as determined by IEEE 02.1 forwarding rules.

In a TANDEM operation, a frame 40 is passed through the AP 12 on the same ring 38a, b to the next downstream AP 12. This may involve queuing in the TANDEM queue 36 to support fairness of access to the DCRR network medium.

When frames 40 are received at an AP 12 on either ring 38, the frame 40 is TANDEMed if: the DCRR frame 40 is not STRIPed AND the encapsulated data 46 is not a DROPped unicast frame.

Functional Components

The Functionality of DCRR according to the present invention is defined by a Topology Maintenance Protocol (TMP). The TMP is a Layer 2 protocol designed to generate and maintain the information required by an AP 12 relating to the active topology of the DCRR network 10. The TMP's objectives are to:

1. Enable APs 12 to failover to redundant resource in a time comparable to SONET failover times (e.g. approximately 50 ms). This is achieved by performing per-link monitoring using frequent messages (i.e., "hello" messages) and by quickly communicating link breaks to other APs 12 in the network 10.
2. Enable optimal traffic forwarding for a given topology and traffic type. In a ring topology, unicast forwarding is optimized for spatial reuse and multicast forwarding is optimized for load distribution. In a linear topology, unicasts are forwarded directionally and multicasts are forwarded in both directions.
3. Prevent frame misordering during topology changes. In general, this is achieved by queue flushing and WAN-side address flushing in the address cache when the topology changes.
4. Enable addition and removal of APs with minimum impact on system connectivity. This is achieved by enabling the TANDEMing of traffic during initialization of a new AP.

The Topology Maintenance Protocol is implemented by means of a Topology Maintenance Protocol (TMP) entity resident within each AP 12. TMP entities communicate with each other by means of protocol data units (PDUs): in-band messages which relay topology information between the TMP entities in a DCRR network 10.

The TMP entity within each AP 12 continuously monitors the topology of the network 10 based on PDUs generated by components of the TMP entity as well as PDVs received from other TMP entities in the DCRR network 10. The active topology is communicated to the learning and forwarding logic within the AP 12 to enable optimal forwarding and learning behaviour and to prevent frame misordering during topology transitions. The following sections describe:

Protocol Data Units (PDUs): the format and purpose of exemplary messages used for communication within and between TMP entities.

TMP Entity Components: exemplary component parts of a TMP entity described in terms of actions, machine states and signals.

Protocol Data Units (Components of a TMP entity in each AP communicates with one another and with TMP entities in other APs by means of protocol data units (PDUs). PDUs are transmitted over the DCRR network medium, they are never transmitted over subtending media.

The Topology Maintenance Protocol uses at least the following PDU types (it being understood that the list below is exemplary and not necessarily comprehensive):

| | |
|---|---|
| LPIM | Link Path Integrity Message |
| LFM | Link Failure Message |
| LRM | Link Recovery Message |
| TDM | Topology Discovery Message |

Link Path Integrity Messages (LPIMs) are used by the TMP entity to maintain the state of a bi-directional link between two adjacent APs. LPIM PDUs preferably carry the following information:

Frame type: LPIM type.

Source's Link Status: current link state.

Checksum: integrity checksum for the message.

The state of each link path 16 is maintained at the downstream end of the link path 16 by monitoring LPIMs transmitted from the upstream AP. These LPIMs are STRIPped at the downstream AP of the link path 16.

For example, referring to FIG. 1*a*, AP3 sends an LPIM over link path 16*a* to AP4 at regular intervals (defined by the DCRR constant: Tlpim—see FIG. 11). Based on reception of the LPIM from AP3, AP4 determines the current link state of link path 16*a*. Similarly, AP4 sends an LPIM over link path 16*b* to AP3 at regular intervals (also of Tlpim). The LPIM sent to AP3 by AP4 contains the current link state of link path 16*a*, which was determined on the basis of the LPIM previously sent by AP3 to AP4. Based on reception of the LPIM from AP4, AP3 can determine the current link status of link path 16*b*, and is notified of the status of link path 16*a*. The current link status of link path 16*b* is included in the next LPIM sent by AP3 to AP4 over link path 16*a*, so that AP4 can determine the current link status of link path 16*b*, and is notified of the status of link path 16*b*. This circular flow of LPIMs between partner APs 12 ensures that each AP 12 is notified in: the event of a fault in a downstream link path 16.

Link Failure Messages (LFMs) are used by the TMP entity to communicate the failure of links 14 (or link paths 16) to other APs 12 in the DCRR network 10. When a link path 16 between two APs 12 fails, each AP 12 on opposite sides of the failed link path 16) transmits LFM PDUs over their opposite WAN port 20 to inform APs 12 located in the direction away from the fault that a link failure has occurred. LFM PDUs preferably carry the following information:

Frame type: LFM type;

TTL: Time To Live;

Source Address: MAC address of the AP 12 that sends the LFM onto the ring 38; and Checksum: Integrity checksum for the message.

LFMs are TANDEMed by intermediate APs 12. They are STRIPped when they can no longer be TANDEMed (the end of a linear path or an end of a failed ring 38 which is operating in failover mode as a linear network) or by the source AP 12 (this later function is a failsafe in the event that the failed link 14 is recovered by the time the LFM travels around the ring 38 and back to its source AP 12).

Link Recovery Messages (LRMs) are used by the TMP entity to communicate the recovery of network links 14 to other APs 12 in the network 10. When a link between two APs 12 recovers from failure, each AP 12 (on opposite sides of the recovered link 14) transmits LRM PDUs over their opposite WAN port 20 to inform APs 12 located in the direction away from the recovered fault that a link recovery has occurred. LRM PDUs preferably carry the following information:

Frame type: LRM type;

TTL: Time To Live;

Source Address: MAC address of the AP 12 that originates the LRM onto the ring; and Checksum: Integrity checksum for the message.

LRMs are TANDEMed by intermediate APs 12. They are STRIPped when they can no longer be TANDEMed (the end of a linear path or the other end of a failed ring 38 which is operating in failover mode as a linear topology) or by the source AP 12 (this later function is a failsafe in the event that the LRM travels around the ring and back to its source AP 12).

Topology Discovery Messages (TDMs) are used by the TMP entity to discover the topology of the DCRR network 10. The TMP entity transmits TDM PDUs over both WAN links 14 when it initiates the topology discovery procedure. TDM PDUs are STRIPped from the ring by the source AP 12. TDM frames preferably carry the following information:

Frame type: TDM type;

TTL: Time To Live;

Source Address: MAC address of the AP 12 that originates the TDM onto the ring;

Checksum: Integrity checksum for the message.

The possible topologies are ring and linear (point-to-point is a linear topology). The topology is discovered to be a ring if the PDUs are received at the opposite port within a specified time, Ttd_to (FIG. 11). The discovered topology defaults to linear after this interval of time waiting for the TDM PDUs if none are received.

Topology Maintenance Protocol Entity Functional Components

Figure 4:
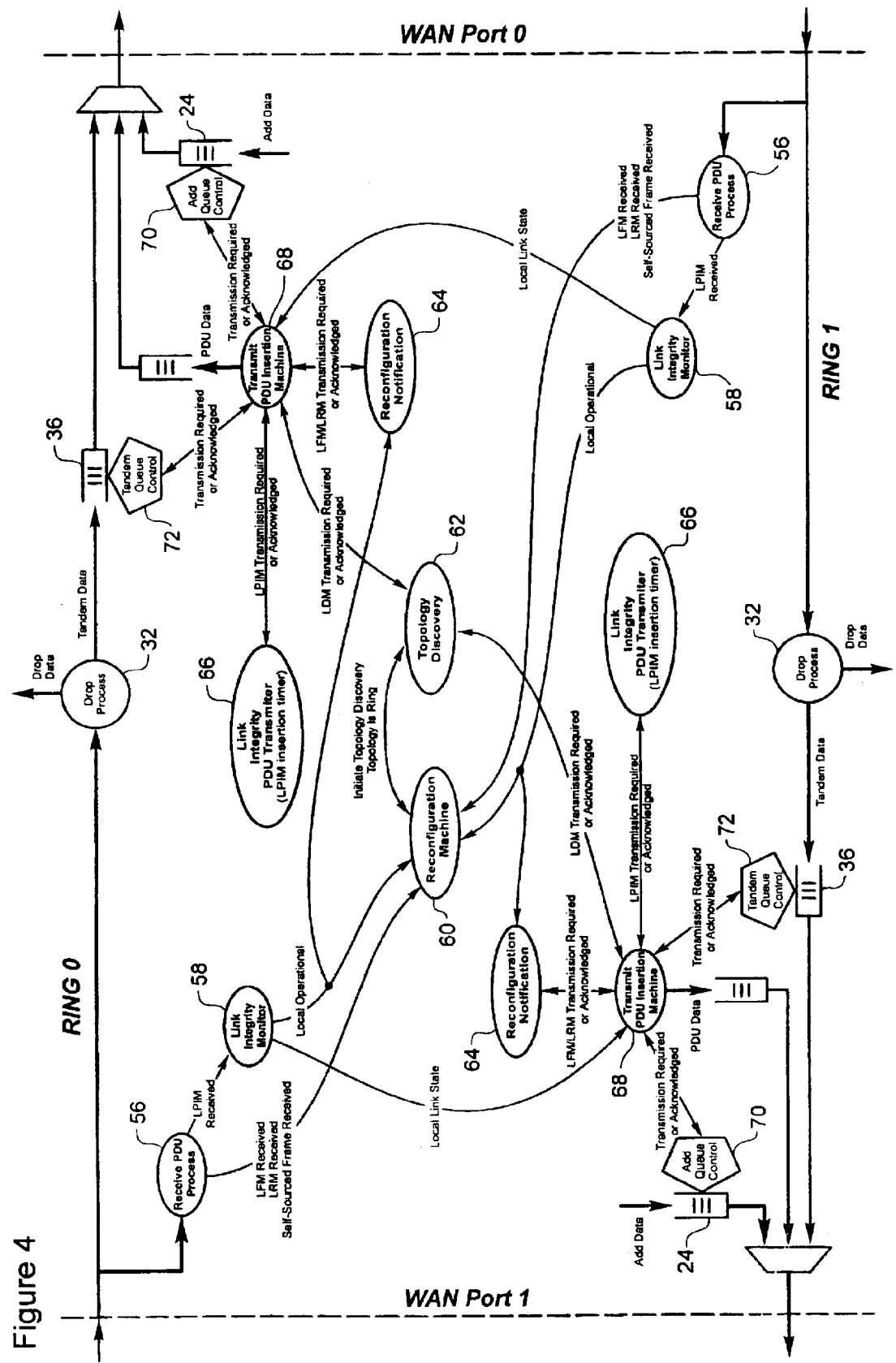
FIG. 4 is a schematic illustration showing system elements and processor signals operative in the node of FIG. 2.

FIG. 4 is a schematic illustration of an exemplary Topology Maintenance Protocol entity operative in an AP 12. For clarity of description and implementation, the TMP entity is conveniently partitioned into: a Receive (RX) PDU Processor 56; a Link Integrity Monitor Machine 58; a Reconfiguration Machine 60; a Topology Discovery Machine 62; a Reconfiguration Notification Machine 64; a Link Integrity PDU Transmit Machine 66; and a Transmit PDU Insertion Machine 68. Each of these functional components are described in detail below in terms of transitions of machine states, actions taken by each component, and the PDU signals used and generated by the respective component.

Receive PDU Processor 56

The Receive PDU Processor 56 decodes PDUs as they are received from a respective link path 16. There are two instances of this processor in each TMP entity—one per WAN port 20. The Receive PDU Processor 56 extracts the protocol information from each received PDU; signals other TMP entity components within the AP 12 of events and TMP information; and causes the STRIPping of some PDU messages. Received PDUs are STRIPped or TANDEMed according to the following logic:

IF (PDU type is LPIM) THEN

STRIP the PDU

ELSIF ((PDU type is LEM, LRM, TDM) AND (PDU source address is AP's address)) THEN STRIP the PDU

ELSE

TANDEM the PDU

END IF

The Receive PDU Processor 56 communicates with the Link Integrity Monitor Machine 58; the Reconfiguration Machine 60; the Reconfiguration Notification Machine 64; and System Management (not shown) by means of PDU signals conveying information of events and/or TMP information contained in PDUs received from the DCRR network 10. Exemplary PDU signals sent by the Receive PDU Processor 56 to the Link Integrity Monitor Machine 58 are:

| PDU Signal | Argument | Description |
| --- | --- | --- |
| LPIM Received | event | A valid LPIM is received. |
| Link Partner's Link Status | level | The value of the Source's Link Status field of the most recently received LPIM. Undefined at system initialization. |

Exemplary PDU signals sent by the Receive PDU Processor 56 to the Reconfiguration Machine 60 are:

| PDU Signal | Argument | Description |
| --- | --- | --- |
| LFM Received | event | A valid LFM is received. |
| LFM TTL Field | level | The value of the TTL field of the most recently received LFM. Undefined at system initialization. |
| LRM Received | event | A valid LRM is received. |
| TDM Received | event | A valid TDM is received. |
| Self-sourced Frame Received | event | A frame is received with source address equal to the local source address. |

Exemplary PDU signals sent by the Receive PDU Processor 56 to the Reconfiguration Notification Machine 64 are:

| PDU Signal | Argument | Description |
| --- | --- | --- |
| LFM Received | event | A valid LFM is received. |
| LRM Received | event | A valid LRM is received. |

Exemplary PDU signals received by the Receive PDU Processor 56 from System Management are:

| PDU Signal | Argument | Description |
| --- | --- | --- |
| Local Source Address | | The address used in the header of frames sourced from this AP. |

Link Integrity Monitor Machine 58

The purpose of the Link Integrity Monitor Machine 58 is to maintain the status of a respective link 14 by monitoring LPIMs received from the upstream partner AP 12 and providing the downstream state to the upstream partner AP 12. The Link Integrity Monitor Machine 58 acts on the TMP information extracted by the Receive PDU Processor 56 from received LPIM PDUs, and makes a local decision as to the integrity of the link 14. There are two instances of this machine in each TMP entity, one for each WAN port 20.

The state of a link 14 is communicated to other TMP entity components and to the up-stream partner AP's Link Integrity Monitor Machine 58. As described above with respect to LPIM PDU's, the upstream link partner AP 12 sends a Link Path Integrity Message (LPIM) PDU to the downstream end at regular intervals (e.g. every Tlpim). The state of each link path 16 is maintained, at the downstream end of the respective link path 16, by monitoring the LPIM PDUs sourced from the upstream end. LPIMs are always STRIPped at the downstream end of the link path 16.

The state of the upstream link partner AP's Link Integrity Monitor Machine 58 is communicated in the LPIM to ensure that the AP 12 is notified in the event of a fault in its downstream path. Exemplary machine states asserted by the Link Integrity Monitor Machine 58 at the downstream end of a link path 16 are as follows:

| State | Description |
| --- | --- |
| Non-operational | This is a System initialization state. It indicates that communication with the link partner is yet to be established. |
| Operational | This is a Normal operating state. |
| Link Fail | This state indicates that the respective link 14 is considered broken. |

Figure 5:
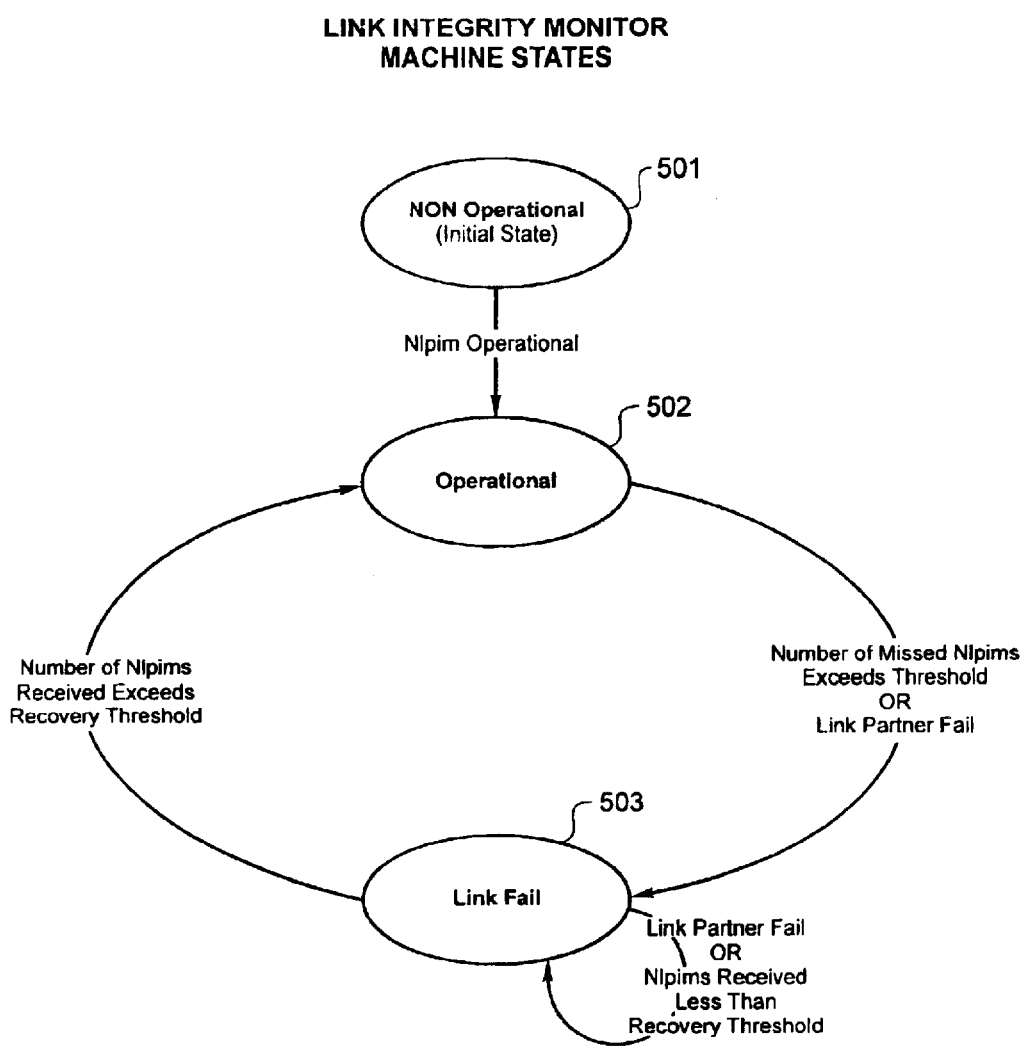
FIG. 5 is a schematic illustration showing the operation of the Link Integrity Monitor in accordance with an embodiment of the present invention.

FIG. 5 schematically illustrates each of the above states, and transition paths followed by the Link Integrity Monitor Machine 58 between these states.

The Link Integrity Monitor Machine 58 transitions from the Non-operational state 501 to the operational state 502 upon receipt of Nlpim operational LPIMs, with an elapsed period of more than 2 Tlpim (FIG. 11) between each LPIM. The Link Integrity Monitor Machine 58 transitions from the Operational state 502 to the Link Fail state 503 when a threshold defined by Nlpim Debounce (FIG. 11) elapses without the receipt of an LPIM or when the upstream link partner AP is in the Link-Fail state. The Link Integrity Monitor Machine 58 transitions from the Link Fail state 503 to the Operational state 502 upon receipt of Nlpim Recovery LPIMs, with no more than 2 Tlpim (FIG. 11) elapsing between each LPIM.

The Link Integrity Monitor Machine 58 communicates with the Receive PDU Processor 56; the Reconfiguration Machine 60; the opposite WAN port's Reconfiguration Notification Machine 64; the Transmit PDU Insertion Machine 68; and System Management by means of PDU signals conveying information of events and/or TMP information with respect to link status. Exemplary PDU signals received by the Link Integrity Monitor Machine 58 from the Receive PDU Processor 56 are:

| PDU Signal | Argument | Description |
| --- | --- | --- |
| LPIM Received | event | A valid LPIM is received. |
| Link Partner's Link Status | level | The state of the link partner's Link Integrity Monitor Machine 58 extracted from the Source's Link Status field of the most recently received LPIM. |

Exemplary PDU signals sent by the Link Integrity Monitor Machine 58 to the opposite WAN port's Reconfiguration Notification Machine 64 are:

| PDU Signal | Argument | description |
| --- | --- | --- |
| Link Failure | level | Asserted when the Link Integrity Monitor machine is in the Link Fail state. |

Exemplary PDU signals sent by the Link Integrity Monitor Machine 58 to the Reconfiguration Machine 60 are:

| PDU Signal | Argument | Description |
| --- | --- | --- |
| Link Operational | level | Asserted when the Link Integrity Monitor machine is in the Operational state. |

Exemplary PDU signals sent by the Link Integrity Monitor Machine 58 to the Transmit PDU Insertion Machine 68 are:

| PDU Signal | Argument | Description |
| --- | --- | --- |
| Local Link State | level | The current state of the Link Integrity Monitor machine. |

Exemplary PDU signals received by the Link Integrity Monitor Machine 58 from System Management are:

| PDU Signal | Argument | Description |
| --- | --- | --- |
| Tlpim | level | The nominal time between successive transmissions of LPIMs. |
| Nlpim Operational | level | The number of LPIMs required to cause a transition from the Non-operational state to the Operational state. |
| Nlpim Debounce | level | The number of LPIM receipt periods (Tlpims) which must elapse to cause a transition from the Operational state to the Link Fail state. |
| Nlpim Recovery | level | The number of LPIMs required to cause a transition from the Link Fail state to the Operational state. |

Reconfiguration Machine 60

The Reconfiguration Machine 60 acts on TMP information extracted by the Receive PDU Processor 56 from received LFM and LRM PDUs, and on the status of each of the links 14 as determined by the respective Link Integrity Monitor Machine 58 to determine the DCRR network topology parameters required by the Frame forwarding process. The Reconfiguration Machine 60 also acts on the link status generated by the Link Integrity Monitor Machine 58 to enable and disable the ADD and TANDEM datapaths 22, 34. There is a single instance of the Reconfiguration Machine 60 in each TMP entity.

Operationally, the Reconfiguration Machine 60 initiates the topology discovery process; enables the ADD and TANDEM datapaths 22, 34; informs the frame forwarding and address learning processes of the topology of the DCRR network; and transitions to a Disconnected state if both WAN ports 20 are not operational as indicated by the respective Link integrity Monitor Machines 58.

The DCRR network link 14 chosen for DCRR frame forwarding is selected based on information from the forwarding process (which uses the optimal forwarding direction assuming an operational ring) and information about the status of the ring. The Reconfiguration Machine 60 provides the frame forwarding logic with ring status information such that a final forwarding decision can be made. Furthermore, the Reconfiguration Machine 60 records the reception and generation of LFM and LRM PDUs at both WAN ports 20 such that appropriate frame forwarding and address learning behaviour may be performed in the time interval between reception of such PDUs. Exemplary machine sates asserted by the Reconfiguration Machine 60 are as follows:

| State | Description |
| --- | --- |
| Disconnect | This is a system initialization Default state, as well as a Default state when no link partner connections exist as indicated by the assertion of an Non-Operational 501 or Link Failure 503 states by both Link Integrity Monitor Machines 58. |
| Single Connection | A single link partner is connected to the AP. |
| Topology Discovery | A topology discovery procedure is being executed by the Topology Discovery Machine 62. |
| Re-Initiate Topology Discovery | A topology discovery procedure must be re-initiated upon completion of the topology discovery procedure in progress. A topology change message has been received since the last time the topology discovery procedure was initiated, so that the procedure must be re-initiated. |
| Linear Topology | The Topology Discovery Machine 62 has discovered that the topology is not a ring. |
| Ring Topology | The Topology Discovery Machine 62 has discovered that the topology is a ring. |
| Link Breaking | The topology was a ring, a link break is detected and communicated by one side of the broken link. |
| Link Repairing | The topology was linear, a link repair is detected and communicated by one side of the once broken link. |

Figure 6:
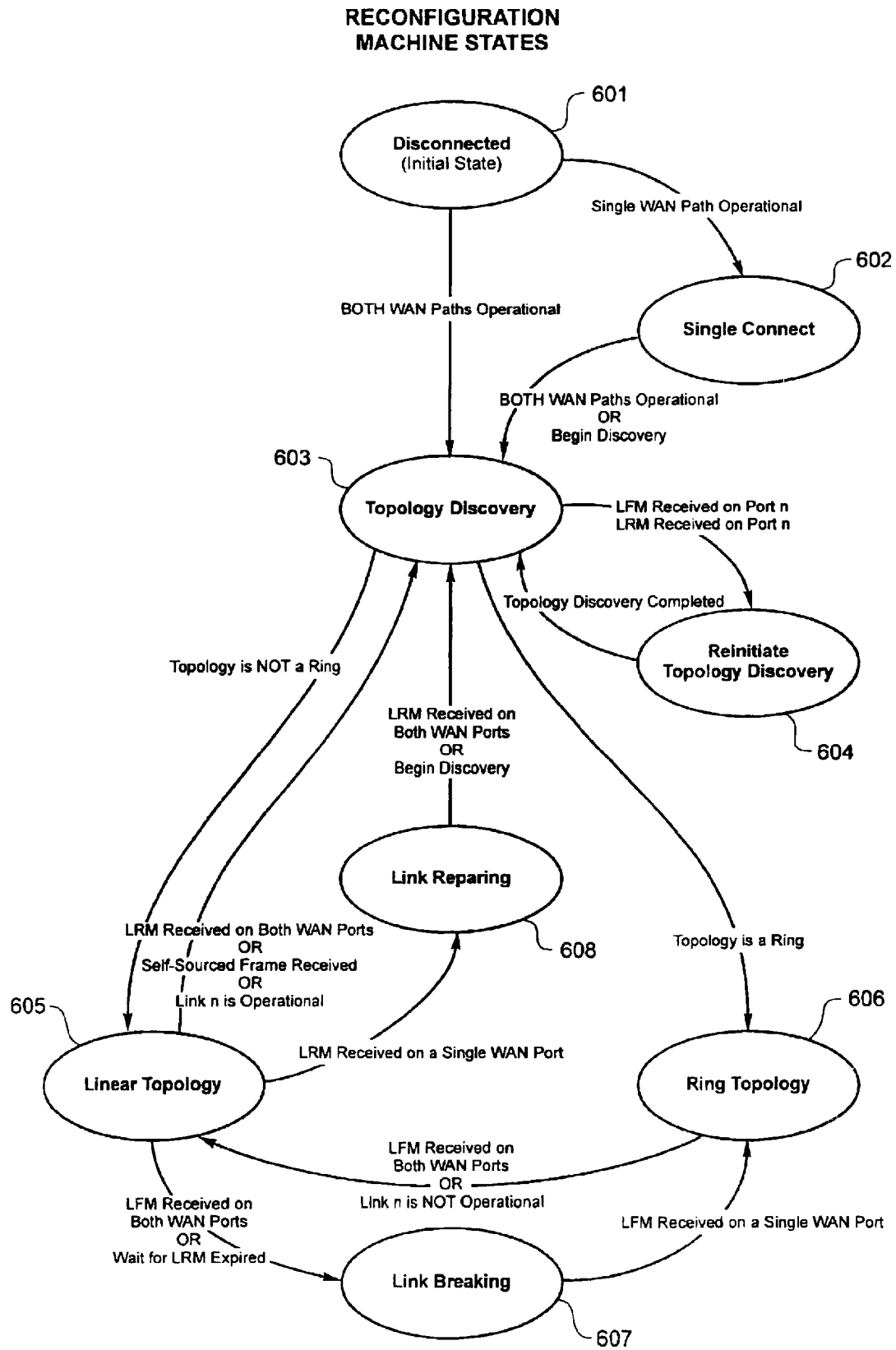
FIG. 6 is a schematic illustration showing the operation of the Reconfiguration Machine in accordance with an embodiment of the present invention.

FIG. 6 schematically illustrates each of the above states and the transition paths followed by the Reconfiguration Machine 6D between these states. The Reconfiguration Machine 60 transitions from the Disconnect state 601 to the Single Connect state 602 when an Operational state 502 (FIG. 5) is asserted by the Link Integrity Monitor Machine 58 at either WAN port 20. When Operational states 502 are asserted by the Link Integrity Monitor Machines 58 at both WAN ports 20 simultaneously, the Reconfiguration Machine 60 transitions from the Disconnect state 601 to the Topology Discovery state 603. The Reconfiguration Machine 60 transitions from the Single Connection state 602 to the Topology Discovery state 603 when Operational states 502 are asserted by the Link Integrity Monitor Machines 58 at both WAN ports 20, or after a time defined by the variable Tsingle_connection (FIG. 11) has elapsed since entry into the Single Connection state 602.

The Reconfiguration Machine 60 transitions from the Topology Discovery state 603 to either the Linear Topology state 605 or the Ring Topology state 606 states based on the results of the topology discovery process executed by the Topology Discovery Machine 62. If an LFM or LRM PDU is received from another AP 12 since the initiation of a topology discovery process, then the Reconfiguration Machine 60 transitions to the Re-Initiate Topology Discovery state 604. Once the topology discovery procedure has been re-initiated by the Topology Discovery Machine 62, the Reconfiguration Machine 60 transitions back from the Re-Initiate Topology Discovery state 604 to the Topology Discovery state 603.

The Reconfiguration Machine 60 transitions from the Linear Topology state 605 to the Topology Discovery state 603 when a self-sourced frame is received at a WAN port 20 (thereby indicating that the topology is a ring), an LRM PDU is received from another AP 12 at both WAN ports 20 (thereby indicating a change in the active topology), or a WAN port's Link Integrity Monitor Machine 58 transitions to the Operational state 502. The Reconfiguration Machine 60 transitions from the Linear Topology state 605 to the Link Repairing state 608 if an LRM PDU is received from another AP 12 at one of the WAN ports 20.

The Reconfiguration Machine 60 transitions from the Ring Topology state 606 to the Link Breaking state 607 when an LFM is received from another AP 12 at one of the WAN ports 20. The Reconfiguration Machine 60 transitions from the Ring Topology state 606 to the Linear-Topology state 605 when an LFM is received from another AP 12 at both of the WAN ports 20 simultaneously, or a WAN port's Link Integrity Monitor Machine 58 transitions out of the Operational state 502. The Reconfiguration Machine 60 transitions from the Link Breaking state 607 to the Linear Topology state 605 when either an LFM is received from another AP 12 on the opposite WAN port 20 or after waiting a predetermined time Tlfm_to (FIG. 11) measured from the time of entry into the Link Breaking state 607.

The Reconfiguration Machine 60 transitions from the Link Repairing state 608 to the Topology Discovery state 603 when either an LRM is received from another AP 12 on the opposite WAN port 20, or after waiting a predetermined time Tlrm_to (FIG. 11) measured from the entry into the Ring Repairing state 608.

The Reconfiguration Machine 60 communicates with the Receive PDU Processor 56; the Link Integrity Monitor Machine 58s (on both WAN ports 20); the Topology Discovery Machine 62; ADD path Queue Control Logic 70 (FIG. 4); ADD path and DROP Path Datapath FIFO Output Controllers (not shown); TANDEM Path FIFO Output Controllers (not shown); the Frame Forwarding Logic; and System Management by means of PDU signals conveying information of events and/or TMP information with respect to ring topology. The Reconfiguration Machine 60 shares signals with TMP entity components on both WAN ports 20 of the AP. For convenience, the signal descriptions below use "n" to denote a port number for signals to a TMP entity component on each WAN port.

Exemplary PDU signals received by the Reconfiguration Machine 60 from the Receive PDU Processor 56 on each WAN port 20 are:

| PDU Signal | Argument | Description |
| --- | --- | --- |
| LFM Received on Link n | event | A LFM is received on DCRR network link n. |
| LRM Received on Link n | event | A LRM is received on DCRR network link n. |
| Self-sourced Frame Received on Link n | event | A frame with source address equal to the address of the AP 12 is received on DCRR network link n. |

Exemplary PDU signals received by the Reconfiguration Machine 60 from the Link Integrity Monitor Machine 58 on each WAN port 20 are:

| PDU Signal | Argument | Description |
| --- | --- | --- |
| Link n Operational | level | The Link Integrity Monitor machine on WAN port 20 n is in the Operational state. |

Exemplary PDU signals sent by the Reconfiguration Machine 60 to the Topology Discovery Machine 62 are:

| PDU Signal | Argument | Description |
| --- | --- | --- |
| Initiate Topology Discovery | event | Asserted when the Reconfiguration Machine 60 enters the Topology Discovery state. It causes the start of a topology discovery procedure. |
| Topology is a Ring | level | When asserted indicates that the DCRR network topology is a ring topology. When not asserted indicates that the DCRR network topology is a linear topology. |

Exemplary PDU signals sent by the Reconfiguration Machine 60 to the ADD Path Queue Control Logic 70 are:

| PDU Signal | Argument | Description |
| --- | --- | --- |
| Ring reconfiguring | event | Asserted on transition from the Ring Topology state to the Link Breaking or Linear Topology states and on transition from the Linear Topology and Link Repairing states to the Topology Discovery states. Signals to the queuing logic that a reconfiguration is in progress. All frames which have been queued for one or the other of the WAN ports 20 must be discarded to avoid frame misordering. |

Exemplary PDU signals sent by the Reconfiguration Machine 60 to the ADD Path and DROP Path Datapath FIFO Output Controllers are:

| PDU Signal | Argument | Description |
| --- | --- | --- |
| AP Payload Data Enable Link n | level | Asserted when the Reconfiguration Machine 60 is in the Linear Topology or the Ring Topology states. When asserted the datapaths associated with the link n are enabled for carriage of payload data. When not asserted these datapaths are not enabled for the carriage of payload data: all frames arriving at the head of a FIFO are discarded. These signals are sampled frame synchronously by the FIFO output controllers. |

Exemplary PDU signals sent by the Reconfiguration Machine 60 to the TANDEM Path FIFO Output Controllers are:

| PDU Signal | Argument | Description |
| --- | --- | --- |
| Tandem Payload Data Enabled on Link n | level | Asserted when the Reconfiguration Machine 60 is not in the Link Breaking or Link Repairing states. When asserted the TANDEM datapath associated with the link is enabled for carriage of payload data. When not asserted the TANDEM datapath is not enabled for the carriage of payload data: all frames arriving at the head of a FIFO are discarded. This signal is sampled frame synchronously by the FIFO output controller. |

Exemplary PDU signals sent by the Reconfiguration Machine 60 to the Frame Forwarding Logic are:

| PDU Signal | Argument | Description |
| --- | --- | --- |
| Ring Broken | level | Asserted when the Reconfiguration Machine 60 is in the Link Breaking and Link Repairing states. Signals to the forwarding logic that the failover forwarding mechanisms must be used. |

Exemplary PDU signals received by the Reconfiguration Machine 60 from System Management are:

| PDU Signal | Argument | Description |
| --- | --- | --- |
| Tsingle_connection | level | The maximum time the Reconfiguration Machine 60 waits for a second link partner before initiating topology discovery. |
| Tlfm_to | level | The maximum time the Reconfiguration Machine 60 waits for LFMs from the opposite side of a broken link. |
| Tlrm_to | level | The maximum time the Reconfiguration Machine 60 waits for LRMs from the opposite side of a broken link. |

Topology Discovery Machine 62

The Topology Discovery Machine 62 acts under the control of the Reconfiguration Machine 60 to determine the active topology of the DCRR network 10 and communicates this information to the Reconfiguration Machine 60. There is a single instance of the Topology Discovery Machine 62 for each TMP entity.

The Topology Discovery Machine 62 indicates to the Transmit PDU Insertion Machine 68 when a ring Topology Discovery Message (TDM) PDU must be inserted onto the ring 38, and makes a topology decision based on the receipt of TDM PDUs by the Receive PDU Processor 56. Additionally, the Topology Discovery Machine 62 maintains a timer on TDM PDUs. Exemplary machine states asserted by the Topology Discovery Machine 62 are as follows:

| State | Description |
| --- | --- |
| Idle | System initialization Default state. |
| Initiate | Initiate topology discovery by requesting transmission of a TDM to the Transmit PDU Insertion Machine 68 of each WAN port 20. |
| Wait for First Validation | Wait for the reception of a self-sourced TDM at either WAN port 20. |
| Wait for Second Validation | Wait for the reception of a self-sourced TDM at the WAN port 20 opposite to the port of reception of the first self-sourced TDM. |

Figure 7:
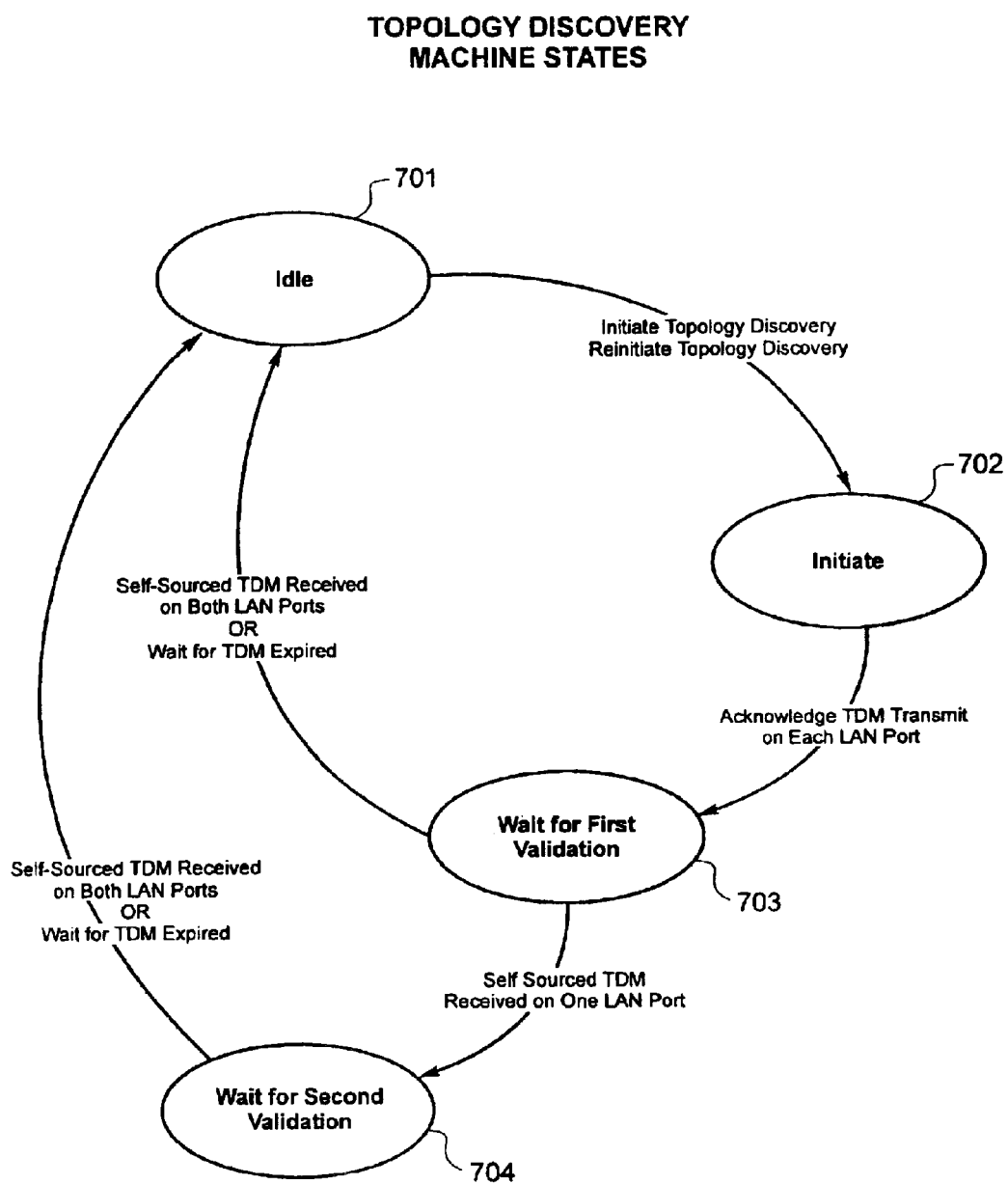
FIG. 7 is a schematic illustration showing the operation of the Topology Discovery Machine in accordance with an embodiment of the present invention.

FIG. 7 schematically illustrates each of the above states, and transition paths between each state. The Topology Discovery Machine 62 transitions from the Idle state 701 to the Initiate state 702 when the Reconfiguration Machine 60 enters an Initiate Topology Discovery state 603 or a Re-initiate Topology Discovery state 604.

The Topology Discovery Machine 62 transitions from the Initiate state 702 to the Wait for First Validation state 703. The Topology Discovery Machine 62 transitions from the Wait for First Validation state 703 to the Wait for Second Validation state 704 upon receipt of a single self-sourced TDM. The Topology Discovery Machine 62 transitions from the Wait for First Validation state 703 to the Idle state 701 upon receipt of two simultaneous self-sourced TDMs, and/or after Ttd_to (FIG. 11) from the time this state was entered.

The Topology Discovery Machine 62 transitions from the Wait for Second Validation state 704 to the Idle state upon receipt of a self-sourced TDM at the opposite WAN port 20. Transition to the Idle state after Ttd_to from the time the Wait for Second Validation state was entered.

The Topology Discovery Machine 62 communicates with the Receive PDU Processor 56; the Reconfiguration Machine 60; the Transmit PDU Insertion Machines 68 (on each WAN port 20); and System Management by means of PDU signals conveying information of events and/or TMP information with respect to ring topology. The Topology Discovery Machine 62 shares signals with TMP entity components on both WAN ports 20 of the AP. For convenience, the signal descriptions below use "n" to denote the link number for signals to a TMP entity component on each WAN port 20.

Exemplary PDU signals received by the Topology Discovery Machine 62 from the Receive PDU Processor 56s are:

| PDU Signal | Argument | Description |
|---|---|---|
| Self-sourced TDM Received | event | Asserted when a TDM PDU is received with source address equal to the local source address. |

Exemplary PDU signals received by the Topology Discovery Machine 62 from the Reconfiguration Machine 60 are:

| PDU Signal | Argument | Description |
|---|---|---|
| Initiate Topology Discovery | event | Asserted when the Reconfiguration Machine 60 enters the Topology Discovery state. It causes the start of a topology discovery procedure. |
| Re-initiate Topology Discovery | level | Asserted when the Reconfiguration Machine 60 receives a topology change information (LEM, LRM receipt) before the end of a topology discovery procedure. It causes the start of a new topology discovery procedure as soon as the previous one is complete. |

Exemplary PDU signals sent by the Topology Discovery Machine 62 to the Reconfiguration Machine 60 are:

| PDU Signal | Argument | Description |
|---|---|---|
| Topology Discovery Completed | event | Asserted when the Topology Discovery Machine 62 completes the execution of a topology discovery procedure. |
| Topology is a Ring | level | When asserted indicates that the DCRR network topology is a ring topology. When not asserted indicates that the DCRR network topology is a linear topology. |

Exemplary PDU signals sent by the Topology Discovery Machine 62 to the Transmit PDU Insertion Machines 68 are:

| PDU Signal | Argument | Description |
|---|---|---|
| TDM Transmission Request on Link n | level | Asserted for both WAN ports 20 when the Topology Discovery Machine 62 is in the Initiate state 702. Asserted for the link not acknowledged when the Topology Discovery Machine is in the Wait Second Validation 704. |

Exemplary PDU signals received by the Topology Discovery Machine 62 from the Transmit PDU Insertion Machine 68s are:

| PDU Signal | Argument | Description |
|---|---|---|
| TDM Transmission Acknowledge on Link n | event | Acknowledgement of the transmission of a TDM. |

Exemplary PDU signals received by the Topology Discovery Machine 62 from System Management are:

| PDU Signal | Argument | Description |
|---|---|---|
| Ttd_to | level | The time the Topology Discovery Machine 62 must wait after the transmission of a TDM before concluding a linear topology. |

Exemplary PDU signals sent by the Topology Discovery Machine 62 to System Management are:

| PDU Signal | Argument | Description |
|---|---|---|
| Unidirectional Ring Timeout | event | A Ttd_to timeout while waiting for the second TDM PDU during topology discovery procedure. |

Reconfiguration Notification Machine 64

The purpose of the Reconfiguration Notification Machine 64 on each WAN port 20 is to initiate the transmission of link failure and recovery messages based on the status of the opposite WAN ports' link 14, and to maintain a hysteresis timer on the state;of the opposite WAN port's link 14.

The Reconfiguration Notification Machine 64 on each WAN port 20 acts on information received from the Link Integrity Monitor Machine 58 of the opposite WAN port 20. Based on PDU signals received from the opposite WAN port's Link Integrity Monitor Machine 58, the Reconfiguration Notification Machine 64 registers when a link failure or link recovery event occurs at the opposite WAN port 20; provides hysteresis on the decision to allow links to settle; and then initiates the transmission of an LFM or LRM, respectively, by the Transmit PDU Insertion Machine 68. There are two instances of the Reconfiguration Notification Machine 64 in a TMP entity—one per WAN port 20. Exemplary states asserted by the Reconfiguration Notification Machine 64 at each WAN port 20 are as follows:

| State | Description |
| --- | --- |
| LRM Hysteresis | System initialization default state. This state provides hysteresis for intermittent links. |
| Last Notification Was LRM | The last notification was a link recovery message, or the link has just come up after system initialization. |
| Transmit LFMs | The link has failed and a LFM must be transmitted to inform other APS 12. |
| LFM Hysteresis | This state provides hysteresis for intermittent links. |
| Last Notification Was LFM | The last notification was a link failure message. |
| Transmit LRMs | The link has recovered and a LRM must be transmitted to inform other APs 12. |

Figure 8:
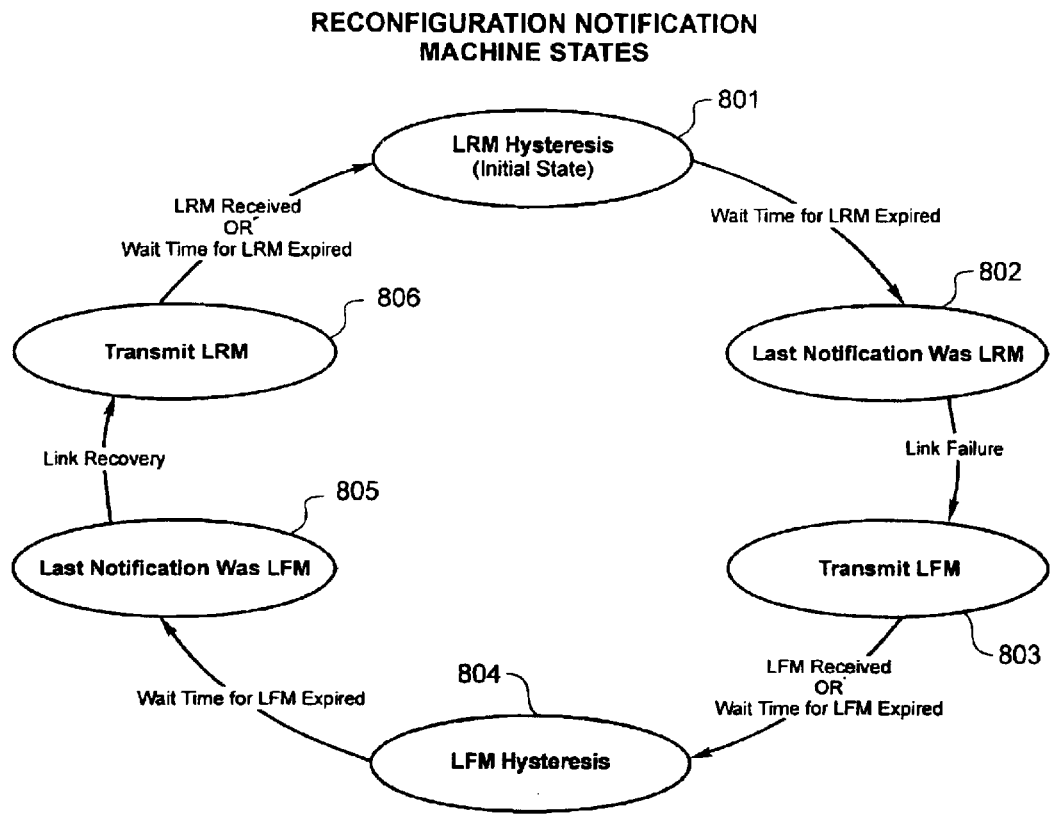
FIG. 8 is a schematic illustration showing the operation of the Reconfiguration Notification Machine in accordance with an embodiment of the present invention.

FIG. 8 schematically illustrates the above listed machine states, and the transitions paths between them. The Reconfiguration Notification Machine 64 transitions from the LRM Hysteresis state 801 to the Last Notification Was LRM state 802 after a period of duration Tlrm_hysteresis_to (FIG. 11) since the time of entry into the LRM Hysteresis state 801. The Reconfiguration Notification Machine 64 transitions from the Last Notification Was LRM state 802 to the Transmit LFMs state 803 if the opposite WAN port's Link Integrity Monitor Machine 58 asserts a Link Fail state 503. The link has failed and a LFM must be transmitted to inform other APs 12. The Reconfiguration Notification Machine 64 transitions from the Transmit LFMs state 803 to the LFM Hysteresis state 804 when LFMs are received as signalled by the Receive PDU Processor 56 or until a period of duration Tlfm_tx_to (FIG. 11) elapses since entry into the Transmit LFMs state 803.

The Reconfiguration Notification Machine 64 transitions from the LFM Hysteresis state 804 to the Last Notification Was LFM state 806 after a period of duration Tlfm_hysteresis_to (FIG. 11) since entry into the LFM Hysteresis state 804. The Reconfiguration Notification Machine 64 transitions from the Last Notification Was LFM state 805 to the Transmit LRMs state 806 if the opposite WAN port's Link Integrity Monitor Machine 58 deasserts its Link Fail state 503. The Reconfiguration Notification Machine 64 transitions from the Transmit LRMs state 806 to the LRM Hysteresis state 801 when LRMs are received as signalled by the Receive PDU Processor 56 or until a period of duration Tlrm_tx_to (FIG. 11) elapses since entry into the Transmit LRMs state 806.

The Reconfiguration Notification Machine 64 communicates with the Receive PDU Processor 56; the Link Integrity Monitor Machine 58 (on the opposite WAN port 20); the Topology Discovery Machine 62; the Transmit PDU Insertion Machine 68; and System Management by means of PDU signals conveying information of events and/or TMP information with respect to link status. Exemplary PDU signals received by the Reconfiguration Notification Machine 64 from the Receive PDU Processor 56 are;

| PDU Signal | Argument | Description |
| --- | --- | --- |
| LFM Received | event | A valid LFM is received. |
| LRM Received | event | A valid LRM is received. |

Exemplary PDU signals received by the Reconfiguration Notification Machine 64 from the Link integrity Monitor Machine 58 of opposite link are:

| PDU Signal | Argument | Description |
| --- | --- | --- |
| Link Failure | level | Asserted when the Link Integrity Monitor machine is in the Link Fail state. |

Exemplary PDU signals sent by the Reconfiguration Notification Machine 64 to the Transmit PDU insertion Machine 68 are:

| PDU Signal | Argument | Description |
| --- | --- | --- |
| LFM Transmission Request | level | Request for the transmission of a LFM. |
| LRM Transmission Request | level | Request for the transmission of a LRM. |

Exemplary PDU signals received by the Reconfiguration Notification Machine 64 from the Transmit PDU Insertion Machine 68 are:

| PDU Signal | Argument | Description |
| --- | --- | --- |
| LFM Transmission Acknowledge | event | Acknowledgement of the transmission of a LFM. |
| LRM Transmission Acknowledge | event | Acknowledgement of the transmission of a LRM. |

Exemplary PDU signals received by the Reconfiguration Notification Machine 64 from System Management are:

| PDU Signal | Argument | Description |
| --- | --- | --- |
| Tlrm_hysteresis_to | level | The minimum time an AP 12 will allow for a link to settle between the time of transmission of an LRM to the transmission of the next LFM. |
| Tlfm_hysteresis_to | level | The minimum time an AP 12 will allow for a link to settle between the time of transmission of an LFM to the transmission of the next LRM. |

Link Integrity PDU Transmit Machine 66

The Link Integrity PDU Transmit Machine 66 indicates to the Transmit PDU Insertion Machine 68 when a Link path Integrity Message (LPIM) PDU must be inserted onto the ring 38. The Link Integrity PDU Transmit Machine 66 is a free running timer scaled to achieve the fastest possible failure discovery while not conflicting with Layer 1 protection mechanisms. There are two instances of the Link Integrity PDU Transmit Machine 66 in a TMP entity—one per WAN port 20.

Exemplary machine states asserted by the Link Integrity PDU Transmit Machine 66 at each WAN port 20 are as follows:

| State | Description |
|---|---|
| Idle | System initialization default state. |
| Transmit LPIM | Asserted when the Transmit PDU Insertion Machine 68 is transmitting an LPIM PDU. |

Figure 9:
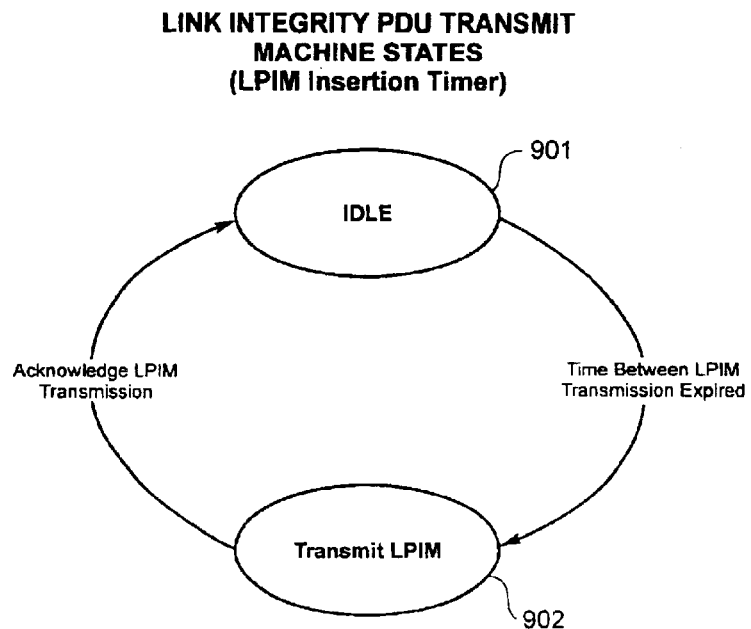
FIG. 9 is a schematic illustration showing the operation of the Link Integrity PDU Transmit in accordance with an embodiment of the present invention.

FIG. 9 is a schematic illustration of the above exemplary states and the transition paths between them. The Link Integrity PDU Transmit Machine 66 transitions from the Idle state 901 to the Transmit LPIM state 902 after a period of duration Tlpim (FIG. 11) since entry into the Idle state 901.

The Link Integrity PDU Transmit Machine 66 transitions from the Transmit LPIM 902 to the Idle state 901 upon acknowledgement of the LPIM transmission by the Transmit PDU Insertion Machine 68.

The Link Integrity PDU Transmit Machine 66 communicates with the Transmit PDU Insertion Machine 68; and System Management by means of PDU signals. Exemplary PDU signals sent by the Link Integrity PDU Transmit Machine 66 to the Transmit PDU Insertion Machine 68 are:

| PDU Signal | Argument | Description |
|---|---|---|
| LPIM Transmission Request | level | Request for the transmission of a LPIM PDU. |

Exemplary PDU signals received by the Link Integrity PDU Transmit Machine 66 from the Transmit PDU Insertion Machine 68 are:

| PDU Signal | Argument | Description |
|---|---|---|
| LPIM Transmission Acknowledge | event | Acknowledgement that the PDU has been sent. |

Exemplary PDU signals received by the Link Integrity PDU Transmit Machine 66 from System Management are:

| PDU Signal | Argument | Description |
|---|---|---|
| Tlpim | level | The period between transmission of LPIM PDUs. |

Transmit PDU Insertion Machine 68

The Transmit PDU Insertion Machine 68 formulates PDUs for transmission, and arbitrates with the TANDEM datapath queue control 72 on a frame-by-frame basis for insertion of the PDUs into the TANDEM data path 34. PDU insertion has the highest priority, followed by the TANDEM and ADD data paths 34, 22. There are two instances of the Transmit PDU Insertion Machine 68 in a TMP entity—one per WAN port 20.

Exemplary states asserted by the Transmit PDU Insertion Machine 68 at each WAN port 20 are as follows:

| State | Description |
|---|---|
| Idle | System initialization Default state. The machine is in this state when there is no PDU transmission pending or transmitting. |
| Deferring | Deferring to the current transmission. |
| Inserting LPIM | A LPIM PDU is being inserted into the TANDEM path. |
| Inserting LFM | A LFM PDU is being inserted into the TANDEM path. |
| Inserting LRM | A LRM PDU is being inserted into he TANDEM path. |
| Inserting TDM | A TDM PDU is being inserted into the TANDEM path. |

Figure 10:
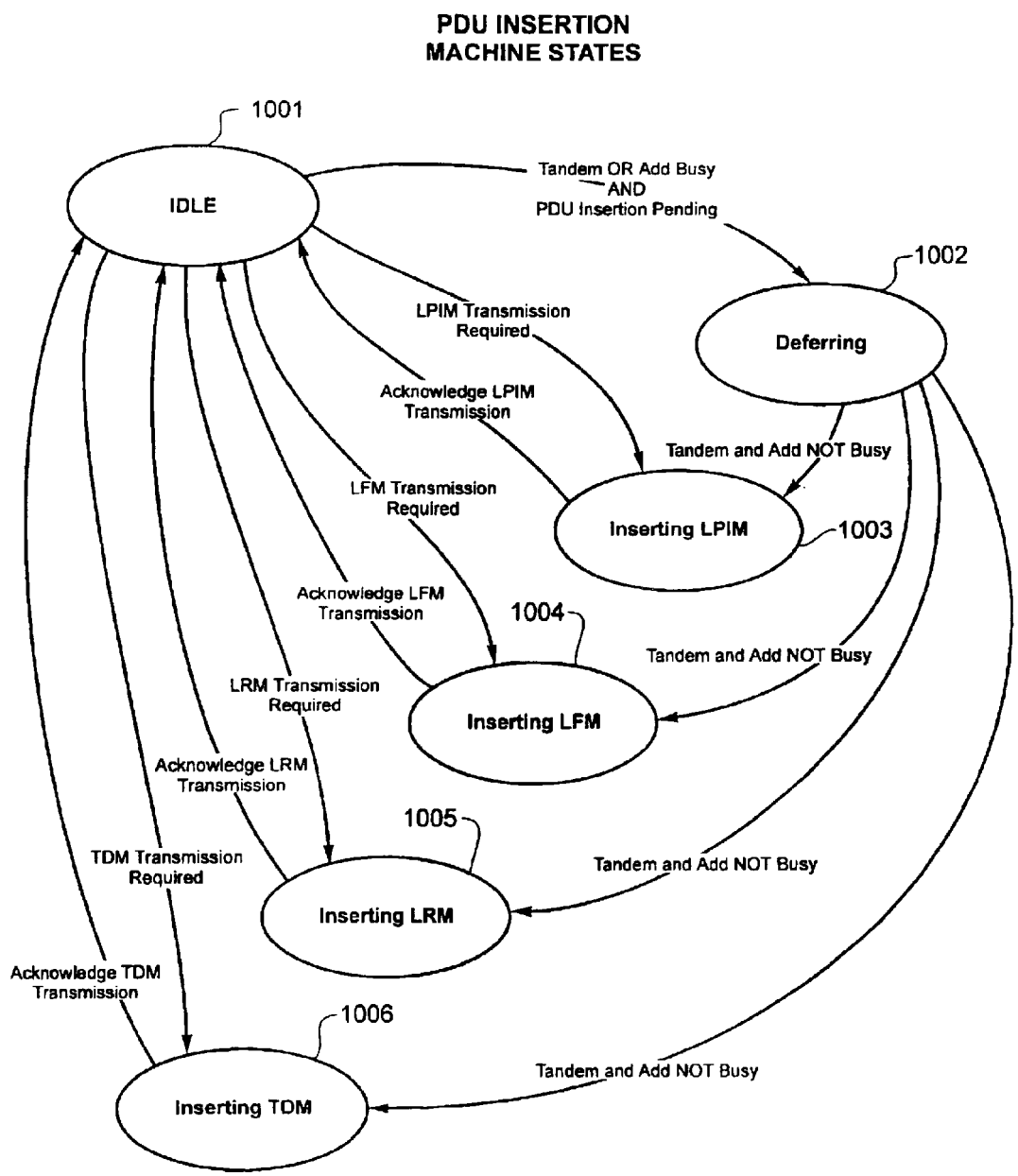
FIG. 10 is a schematic illustration showing the operation of the PDU Insertion Machine in accordance with an embodiment of the present invention.

FIG. 10 schematically illustrates the above exemplary states and transition paths between them.

The Transmit PDU Insertion Machine 68 transitions from the Idle state 1001 to the Deferring state 1002 if the TANDEM path 34 or the ADD path 22 are active at the time a PDU transmission is requested.

The Transmit PDU Insertion Machine 68 transitions from the Idle state 1001 to an appropriate Inserting state 1003–1006 directly when no other transmission is active at the time a PDU transmission is requested. The Transmit PDU Insertion Machine 68 transitions from the Deferring state 1002 to an appropriate Inserting state 1003–1006 at the end of the current transmission on the TANDEM or ADD paths 34, 22. The Transmit PDU Insertion Machine 68 transitions from the Inserting LPIM state 1003 to the Idle state 1001 upon completion of LPIM PDU insertion. The Transmit PDU Insertion Machine 68 transitions from the Inserting LFM state 1004 to the Idle state 1001 upon completion of LFM PDU insertion. The Transmit PDU Insertion Machine 68 transitions from the Inserting LRM state 1005 to the Idle state 1001 upon completion of LPIM PDU insertion. The Transmit PDU Insertion Machine 68 transitions from the Inserting TDM state 1006 to the Idle state 1001 upon completion of TDMM PDU insertion.

The Transmit PDU Insertion Machine 68 communicates with the Reconfiguration Notification Machine 64; the Topology Discovery Machine 62; the Link Integrity PDU Transmit Machine 66; System Management; the Tandem Datapath Queue Output Control; and the Tandem Datapath PDU Insertion Multiplexer by means of PDU signals. Exemplary PDUs received by the Transmit PDU Insertion Machine 68 from the Reconfiguration Notification Machine 64 are:

| PDU Signal | Argument | Description |
|---|---|---|
| LFM Transmission Request | level | Request for the transmission of a LFM. |
| LRM Transmission Request | level | Request for the transmission of a LRM. |

Exemplary PDUs sent by the Transmit PDU Insertion Machine 68 to the Reconfiguration Notification Machine 64:

| PDU Signal | Argument | Description |
|---|---|---|
| LFM Transmission Acknowledge | event | Acknowledgement of the transmission of a LFM. |
| LRM Transmission Acknowledge | event | Acknowledgement of the transmission of a LFM. |

Exemplary PDUs received by the Transmit PDU Insertion Machine 68 from the Topology Discovery Machine 62 are:

| PDU Signal | Argument | Description |
|---|---|---|
| TDM Transmission Request | level | Request for the transmission of a TDM. |

Exemplary PDUs sent by the Transmit PDU Insertion Machine 68 to the Topology Discovery Machine 62 are:

| PDU Signal | Argument | Description |
|---|---|---|
| TDM Transmission Acknowledge | event | Acknowledgement of the transmission of a TDM. |

Exemplary PDUs received by the Transmit PDU Insertion Machine 68 from the Link Integrity PDU Transmit Machine 66 are:

| PDU Signal | Argument | Description |
|---|---|---|
| LPIM Transmission Request | level | Request for the transmission of a LPIM. |

Exemplary PDUs sent by the Transmit PDU Insertion Machine 68 to the Link Integrity PDU Transmit Machine 66 are:

| PDU Signal | Argument | description |
|---|---|---|
| LPIM Transmission Acknowledge | event | Acknowledgement of the transmission of a LPIM. |

Exemplary PDUs received by the Transmit PDU Insertion Machine 68 from the Link Integrity Monitor Machine 58 are:

| PDU Signal | Argument | Description |
|---|---|---|
| Current Link State | level | The current state of the Link Integrity Monitor state machine. This is transmitted in LPIMs to the link partner. |

Exemplary PDUs received by the Transmit PDU Insertion Machine 68 from System Management are:

| PDU Signal | Argument | Description |
|---|---|---|
| Local Source Address | | The source address used in the header of PDUs sourced from this AP. |
| PDU Destination Address | | The destination address used in the header of PDUs sourced from this AP. |

Exemplary PDUs received by the Transmit PDU Insertion Machine 68 from the TANDEM Datapath Queue Output Control:

| PDU Signal | Argument | Description |
|---|---|---|
| Payload Frame Transmission Request | level | The TANDEM path requests transmission of a frame. |
| Payload Frame Transmission In Progress | level | The TANDEM path is in progress on the transmission of a frame frame. |

Exemplary PDUs sent by the Transmit PDU Insertion Machine 68 to the TANDEM Datapath Queue Output Control are:

| PDU Signal | Argument | Description |
|---|---|---|
| Payload Frame Transmission Acknowledge | event | The TANDEM path is permitted to transmit a frame. |

Exemplary PDUs sent by the Transmit PDU Insertion Machine 68 to the Tandem Datapath PDU Insertion Multiplexer are:

| PDU Signal | Argument | Description |
|---|---|---|
| Inserted PDU | level | The datapath of the PDU to be inserted into the TANDEM path. |
| Inserted PDU Select | level | The select signal for the multiplexer to chose between the TANDEM payload data path and the PDU insertion path. |

Walk-through of Exemplary Connection Scenarios

The operation of the TMP entity will now be illustrated by way of a series of exemplary connections, each of which involves a change in the DCRR network topology. The first connection involves the addition of a new AP 12 to an existing, stable DCRR network 10. This is followed by exemplary failover and recovery scenarios, in which the topology of the DCRR network 10 changes as a result of the failure and subsequent recovery of a network component (e.g. a link 14 or an AP 12).

New AP Added to A Network Between Operating APs

The following exemplary walk-through describes the insertion of a new AP 12 between two APs 12 in a stable DCRR network 10. Insertion of a new AP 12 onto a DCRR network 10 results in the following sequence of events:
1. The Link Integrity Monitor Machines 5 of the AP 12 being inserted initialize to the Non-operational state 501 and subsequently transition to the Operational state 502 upon receipt of Nlpim operational LPIMs from the respective link partners.
2. The respective link partner's Link Integrity Monitor Machines 58 remain in the Operational state 502 because: the new AP 12 (their new link partner) is not in the Link Fail state 503; the new link partner's Link Integrity PDU Transmit Machine 66 causes transmission of LPIM PDUs which keep the links active; and the Layer 2 hysteresis on the receipt of LPIMs covers the Layer 1 switchover time.
3. In response to assertion of the Operational state 502 by the Link Integrity Monitor Machines 58 on both WAN ports 20 of the new AP 12, the Reconfiguration Machine 60 of the new AP 12 initiates a topology discovery procedure by the Topology Discovery Machine 62.

4. Following completion of the topology discovery procedure, the Reconfiguration Machine 60 communicates the active topology to the frame forwarding logic and enables the ADD and TANDEM paths 22, 34.

In this example, the activation time of an AP 12 for a ring topology is approximately:

Tactivation ring=(Nlpim+1)*Tlpim+Trtd+(N−1)*Tmax frame Where: Trtd is the round-trip delay of the ring; N is the number of APs attached to the ring; and Tmax frame is the time needed to transmit one maximum length frame. Note that since the TANDEM path 34 is enabled in all states except those resulting from a broken ring, the effect of the activation of a new AP 12 on the other APs 12 in a ring is confined to the time required to electrically insert the new device.

The activation time of an AP 12 for a linear topology is approximately:

Tactivation linear=(Nlpim+1)*Tlpim+Td to

Single Ring Link Failure and Recovery

Loss of a single link results in the following sequence of events:

1. Link Integrity Monitor Machines 58 in APs 12 at either end of the failed link 14 transition from the Operational state 502 to the Link Fail state 503.
2. In each of these APs 12:
    a) The Reconfiguration Notification Machine 64 initiates transmission of LFM PDUs in a direction away from the failed link. These LFM PDUs are transmitted continuously until LFM PDUs are received from the other side of the failed link.
    b) A Ring Broken On Link n parameter for the failed link is set to 1.
    c) Forwarding payload frames to the failed link is stopped.
    d) All frames destined to a specific link are flushed.
    e) The ADD datapath is disabled.
    f) Each AP 12 then waits for the LFM from the link partner of the broken link, then:
        i. Ages the WAN-side address cache;
        ii. Stops transmitting LFM PDUs; and
        iii. Re-enables the ADD datapath 22 (broken ring/ linear topology forwarding/learning):
3. Upon receipt of an LFM, other APs 12 in the DCRR network 10:
    a) Decrement the LFM PDU's TTL field and pre-emptively TANDEM the LFM PDU.
    b) Set a Ring Broken On Link N variable for the link on which the LFM PDU was received to 1.
    c) Flush all frames destined to a specific link.
    d) Disable the ADD datapath 22.
    e) Wait for the end of LFM PDU reception on both links, then:
        i. Age the WAN-side address cache; and
        ii. Re-enable the ADD datapath 22 (broken ring/ linear topology forwarding/learning).
4. Upon receipt of an LFM PDU at the originating AP, the LFM PDU is STRIPped (this is a failsafe—the LFM PDU should never make it back, because the ring is broken).
5. At each AP, before ADDing frames to a ring:
    a) The Ring Broken On Link N bits associated with each of the WAN ports 20 are checked. If either bit is set, frame forwarding is conduced according to linear topology forwarding rules.
    b) Otherwise frame forwarding is conducted according to ring topology forwarding rules.

Recovery of the single link failure results in the following sequence of events:

1. AP 12 Link Integrity Monitor Machines 58 at either end of the recovered link 12 transition from the Link Fail state 503 to the Operational state 502.
2. These APs 12:
    a) Initiate transmission of LRMs in the direction away from the recovered link. These are transmitted continuously until LRMs are received from the other side of the recovered link.
    b) Set Ring Broken On Link N variable for the failed link to 0.
    c) Flush all frames destined to a specific link.
    d) Wait for the LRM from the link partner of the recovered link, then:
        i. Stop transmitting LRMs;
        ii. TANDEM the link partner's LRMs;
        iii. Age the WAN-side address cache;
        iv. Initiate topology discovery; and
        v. Re-enable the ADD datapath 22 (forwarding/ learning according to discovered topology).
3. Upon receipt of an LRM PDU, other APs 12 in the DCRR network:
    a) Decrement the LRM PDUs TTL and pre-emptively TANDEM the LRM PDU.
    b) Set Ring Broken On Link N for the link on which the LFM PDU was received to 0.
    c) Flush all frames destined to a specific link.
    d) Wait for the end of LRM PDU reception on both links, then:
        i. Age the WAN-side address cache;
        ii. Initiate topology discovery; and
        iii. Re-enable the ADD datapath 22 (forwarding/ learning according to discovered topology).
4. Upon receipt of an LRM PDU at the originating AP, the LRM PDU is STRIPed.

Link Path 16 Failure and Recovery

The failure of one of the paths 16 of a link 14 results in the same behaviour as the full link failure case described above, except that the downstream side of the failed link 14 begins the transmission of LFM PDUs before the failure is communicated via LPIM PDU transmission to the upstream end.

It is possible for the LFM PDU stream to reach the link partner of the failed link before the LPIM PDU indicating the failure. In this case the link partner, unaware of the failure of the link path 16, will TANDEM the LPIM PDU stream. In this case the LPIM PDUs are STRIPped by the source AP. Once the link partner receives the next LPIM PDU it will recognize the broken link and initiate LFM PDU transmission.

Multiple Link Failure and Recovery

Loss of multiple links will result in isolation of one or more APs 12, effectively making one or more linear segments. Communication between segments will not be possible during the break. On opposite sides of each break, the Link Integrity Monitor Machines 58 will transition from the Operational state 502 to Link Fail state 503. These APs 12 will behave the same as in Single Link Failure case.

Link Integrity Monitor Machine 58 transitions to Link Fail state 503 will initiate transmission of LFM PDUs away from the break. This will enable APs 12 in each linear segment to update the Ring_Broken_On_Link_n variables in the same manner as during the single link failure described above.

Recovery of a multiple link failure works the same as recovery from single link failure except that, on recovery of the first link 14, the topology discovery process will result in discovery of a linear topology. The topology discovery result from the recovery of the second (or last broken) link re-establishes the intended ring topology.

AP 12 Failure & Recovery

AP 12 failure is handled like a single link failure. AP 12 Link Integrity Monitor Machines 58 on the link partner WAN ports facing the tailed AP 12 will transition from the Operational state 502 to the Link-Fail state 503. From this point the failure operation is the same as during the single link failure described above. Similarly, recovery of a failed AP 12 results in a similar sequence of events as in a single-link recovery.

Exemplary Data Throughput Comparisons

The following is an exemplary comparison of the data frame throughput of a DCRR network 10 in accordance with the present invention versus that of two conventional ring network technologies: Ethernet SONET and FDDI. For the purposes of the present comparison, the following general assumptions with respect to each of the networks will apply:

1. A physical ring topology;
2. Redundant provisioning (full duplex connections between APs);
3. Protection is required—Level 2 protection is acceptable. The present comparisons assume 2 fiber BLSR with Level 1 protection disabled for DCRR, 2 fiber UPSR for Ethernet over SONET, and a dual counter rotating ring FDDI network;
4. n APs are attached to the ring;
5. Each AP joins a single source to the ring; and
6. B is the bandwidth capacity of each link path 16 between adjacent AP.

Comparison 1: Full Utilization Case

In this case, each AP is assumed to transmit at a rate R with equal portions of the traffic going to each of the n−1 destination APs (i.e. a mesh traffic pattern). Each AP therefore receives n−1 equal streams of rate equal to R/(n−1). The three networks are compared by calculating the bandwidth, B, required to handle this traffic in each respective network.

Conventional Dual Counter Rotating Ring FDDI Network

In a conventional Dual Counter rotating Ring FDDI Network, payload traffic is carried in a single direction around the ring. All traffic is carried all the way around the ring and STRIPped by the sender. The bandwidth required in the links between adjacent APs is given by the sum of the contributions from each source. Since traffic is STRIPped by the sending AP the bandwidth required is the number of APs transmitting onto the medium times the rate of each transmitting AP:

B=nR.

Conventional Ethernet SONET Network

In a conventional Ethernet SONET Network, payload traffic is carried in a single direction around the ring. All traffic is carried to its destination AP where it is "dropped". Thus R/(n−1) is dropped from each source AP at each destination AP.

The bandwidth occupied by the traffic carried from a source AP to a destination AP on the ring is re-used for the traffic back from the destination AP (now the source) to the source AP (now the destination).

Given this re-use, the contribution of a given source AP to the bandwidth consumption of a given link decreases the further upstream from the source the AP is located. The AP attached to the link in question, AP1, contributes (n−1)R/(n−1) of bandwidth requirement (equal to R, or all of the AP1's payload). The next upstream AP, AP2, contributes (n−2)R/(N−1) (equal to all of the AP2's payload less that dropped at AP1) Again, the bandwidth required in the links between adjacent network elements is given by the sum of the contributions from each source AP:

$$B = \sum_{m=0}^{(n-1)} m\left(\frac{R}{(n-1)}\right)$$

$$= (n-2)\frac{R}{2}$$

$$\approx n\frac{R}{2} \text{ for large } n.$$

Thus the bandwidth required by the conventional SONET network is approximately half of that required by the conventional FDDI network.

DCRR Network in Accordance with the Invention

In accordance with the present invention, payload traffic is carried in two directions around the rings (using the conventionally redundant ring for payload). All traffic is carried to its destination AP where it is "dropped". Thus $$\frac{R}{2}\left(\frac{R}{(n-1)}\right)$$

is dropped from each source AP at each destination AP. The bandwidth occupied by the traffic carried from a source AP to a destination AP on the ring is re-used by the destination AP.

Again, given the re-use, the contribution of a given source AP to the bandwidth consumption of a given link decreases the further upstream from the source AP is located. The AP attached to the link in question, AP1, contributes $$(n-1)\left(\frac{R}{2(n-1)}\right)$$

of bandwidth requirement (equal to R/2, or all of the AP's payload in that direction around the ring). The next upstream AP, AP2, contributes $$(n-2)\left(\frac{R}{2(n-1)}\right)$$

which is equal to all of the AP2's payload less that dropped at AP1. Again, the bandwidth required in the links between adjacent network elements is given by the sum of the contributions from each source:

$$B = \sum_{m=0}^{(n-1)/2} m\left(\frac{R}{2(n-1)}\right)$$

$$= (n-3)\frac{R}{4}$$

$$\approx n\frac{R}{4} \text{ for large } n.$$

Thus the bandwidth required is approximately half of that required by a conventional SONET network and of that required by a conventional FDDI network.

Comparison 2: Lightly Loaded Case

In this case, a single AP is assumed to transmit at a rate R with equal portions of the traffic going to the n−1 destination APs (mesh traffic pattern). The three networks are compared by calculating the maximum transmission rate, R, achievable by the transmitting single AP in each respective network.

Conventional Dual Counter Rotating Ring FDDI Network

Each AP has access to the full bandwidth of the medium as long as the token can be held, Ttht. The token must then be released and is not re-acquired until all other AP have released it. Because none of the other AP are transmitting, the time to reacquire the token can be estimated to be approximately equal to a ring round trip delay, Trtd.

The average rate achieved by a sender AP is then given by the percentage of time the sender holds the token:

$$R = B\left(\frac{Ttht}{(Ttht + Trtd)}\right)$$

Conventional Ethernet SONET Network

Each AP can only use its allocated bandwidth regardless of how much of the medium's bandwidth is available. Assuming the bandwidth is provisioned evenly among all APs, the average rate of a source AP is equal to its share of the bandwidth:

$$R=B/n$$

DCRR Network in Accordance with the Present Invention

Each AP has fair access to the medium. If no other APs are actively transmitting, a single source AP can use all of the bandwidth of the dual ring network:

$$R=2B$$

This comparison (lightly loaded network) illustrates the ability of the DCRR in accordance with the invention to enable opportunistic burst access (at dramatically increased transmission rates) by any single AP to exploit available bandwidth on the network.

The embodiments of the invention described above are intended to be exemplary only. Changes and modifications will no doubt become apparent to those of skill in the art. The scope of the invention is therefore intended to be limited solely by the scope of the appended claims.

We claim:

1. A system for discovering and monitoring an active topology of a dual counter rotating ring (DCRR) at a data link layer in order to enable optimal frame forwarding from a medium to the DCRR and to provide rapid failover in a network component failure event, each access point in the DCRR comprising:
   a) a topology maintenance protocol (TMP) entity for monitoring individual links of the DCRR, discovering the active topology of the DCRR, communicating topology changes to other access points in the DCRR, and informing frame forwarding and learning processes of the topology to enable failover to a redundant path;
   b) a frame forwarding process for selecting a shortest path route between a source and destination access point in the DCRR; and
   c) an address learning process for inspecting a source medium access control (MAC) address in each received frame to learn a shortest path route for each MAC address.

2. The system as claimed in claim 1 wherein the topology maintenance protocol entity comprises:
   a) a Receive PDU Processor for receiving incoming protocol data units (PDUs), extracting information from the PDUs and distributing the information to other local topology learning entity components, as required;
   b) a link integrity monitor machine (LIMM) for deciding a sanity of links terminated at the access point, and communicating a state of links terminated at the access point to other local topology learning components and to upstream link partners;
   c) a reconfiguration machine (RM) to determine DCRR topology parameters required by the forwarding process;
   d) a topology discovery machine (TDM) for determining the active topology of the DCRR;
   e) a reconfiguration notification machine (RNM) for controlling insertion of ring reconfiguration messages into a ring of the DCRR;
   f) a link integrity PDU transmit (LIPT) machine for controlling insertion of link integrity PDUs onto a ring of the DCRR; and
   g) a PDU insertion machine (PIM) which arbitrates with the tandem data path payload queue for insertion of the PDUs onto the DCRR.

3. The system as claimed in claim 1 wherein the receive PDU processor extracts protocol information from received PDUs, passes the information to other TMP entity components and terminates one or more predetermined PDU message types.

4. The system as claimed in claim 3 wherein the PDU message types terminated by the receive PDU processor comprise:
   a) link path integrity messages; and
   b) if the source address of a message matches an address of the access point:
      i. link failure messages;
      ii. link recovery messages; and
      iii. topology discovery messages.

5. The system as claimed in claim 4 wherein each topology maintenance protocol entity includes two receive PDU processors, one for each WAN port of a respective access point.

6. The system as claimed in claim 2 wherein the PDUs comprises:
   a) link path integrity messages (LPIM) used to determine the state of a bi-directional link between two adjacent points in the DCRR;
   b) link failure messages (LFM) used to communicate the failure of network links to other access points in the DCRR;
   c) link recovery messages (LRM) used to communicate the recovery of network links to other access points in the DCRR;
   d) link topology discovery messages (TD) used to discover the topology of the DCRR.

7. The system as claimed in claim 6 wherein information in the LFM comprises:
   a) frame type identifier;
   b) a source link status containing a current state of the source link; and
   c) an integrity checksum.

8. The system as claimed in claim 6 wherein information in each of the LFM, LRM and TDM comprises:
   a) a frame type identifier;
   b) a time to live variable;

c) a source address of an MAC that initiated the LRM onto the ring; and d) an integrity checksum.

9. The system as claimed in claim 2 wherein the LIMM monitors link path integrity messages sent by an upstream link partner access point to determine a state of the link path and provides the downstream state of the link path to the upstream link partner access point.

10. The system as claimed in claim 9 wherein the topology protocol entity includes two instances of the LIMM, one for each ingress link in the DCRR.

11. The system as claimed in claim 9 wherein the LIMM further performs the functions of:

a) periodically passing to an opposite port's RNM a link failure assertion message when the LIMM is in an operational state;

b) periodically passing to the RM a link operational level assertion message when the LIMM is in an operational state;

c) periodically passing to the PIM a local link state message which represents a current state of the LIMM.

12. The system as claimed in claim 9 wherein the LIMM receives from a management function the following operating parameters:

a) a nominal time between successive transmissions of LPIMs;

b) a number of LPIMs required to cause a transition from a non-operational state to an operational state;

c) a number of LPIM receipt periods that must elapse to cause a transition from an operational state to a link fail state; and d) a number of LPIMs required to cause a transition from the link fail state to the operational state.

13. The system as claimed in claim 2 wherein the RM provides the forwarding process with information about the status of the DCRR and records the reception and generation of LFM and LRM messages at each DCRR port to control forwarding and learning behavior between reception of the messages.

14. The system as claimed in claim 13 wherein the RM further performs the actions of:

a) intiating a topology discovery process;

b) enabling port ADD and TANDEM payload datapaths;

c) informing the forwarding and learning processor of the topology of the DCRR; and d) transitions to a disconnected state if both access points are non-operational as indicated by the LIMMs.

15. The system as claimed in claim 2 wherein the TDM performs topology discovery under the control of the RM and maintains a timer for the sending of topology discovery messages.

16. The system as claimed in claim 15 wherein the TDM further preforms the following function:

a) informs the RM of a completion of a topology discovery procedure, and the configuration of the DCRR on completion of the topology discovery procedure;

b) sends topology discovery message requests to the TPIM when a topology discovery message is to be sent or an acknowledgement of a topology discovery message received from another point in the DCRR is to be sent;

c) informs management of the occurrence of a timeout while waiting for a second topology discovery message during a topology discover procedure.

17. The system as claimed in claim 2 wherein the RNM registers when a link failure or a link recovery event occurs at an opposite DCRR port, and maintains a hysteresis timer on a state of an opposite DCRR port link to permit the port link to settle in the event of a link failure or link recovery.

18. The system as claimed in claim 17 wherein there is one instance of the RNM for each DCRR port.

19. The system as claimed in claim 17 wherein the RNM receives from a management function the following parameters:

a) a value representing a minimum time period for determining a link to settle between the transmission of an LRM and the transmission of an LFM; and b) a value representing a minimum time period for determining a link to settle between the transmission of an LFM and the transmission of an LRM.

20. The system as claimed in claim 2 wherein the LIPT is a free running timer sealed to achieve the fastest possible failure discovery while not conflicting with layer 1 transport protection mechanisms.

21. The system as claimed in claim 20 wherein the LIPT receives from a management function a value representative of a time period which controls a frequency of transmission of link path integrity messages.

22. The system as claimed in claim 2 wherein therein the is an instance of the PIM for each DCRR port.

23. The system as claimed in claim 22 wherein each PIM arbitrates for access to a corresponding link on a frame-by-frame basis with PDU insertion as a highest priority, TANDEM path access has second priority, and ADD path access has lowest priority.

24. The system as claimed in claim 1 wherein the forwarding process performs a hash over the address of multicast and flooded traffic to yeild a single bit has result that is used to specify a direction for forwarding around the DCRR.

25. The system as claimed in claim 24 wherein IP address are further included in the hash calculation to ensure load sharing between routers and between routers and servers subtending the traffic.

26. The system as claimed in claim 1 wherein when an address of a frame is known, the forwarding process chooses a shortest path direction for forwarding a frame by learning a number of hops to another given access point that subtends the traffic.

27. The system as claimed in claim 1 wherein if the DCRR is a linear or broken ring topology, the forwarding process forwards all flood and multicast frames in each direction.

28. A method for discovering and monitoring an active topology of a dual counter rotating ring (DCRR) at a data link layer of the DCRR in order to enable optimal frame forwarding from a local area network (LAN) to the DCRR and to provide rapid failure in a network component failure event, comprising the steps of:

a) monitoring individual links of the DCRR by sending and receiving link path integrity messages, the link path integrity messages being sent to downstream link partner access points and received from upstream link partner access points, the monitored links being the links on which link path integrity messages are received at each access point in the DCRR;

b) discovering an active topology of the network by periodically entering an active topology discovery state in which topology discovery messages are sent on the ring and topology discovery messages are received;

c) communicating changes in the active topology due to failure of monitored links to other access points in the network; and d) informing frame forwarding and address learning processes within each access point of the active topology to enable failover communications to redundant resources.

29. The method as claimed in claim 28 wherein the link path integrity messages are sent a rate that ensures rapid failover to redundant resources without interfering with a layer 1 protection protocol of the DCRR.

30. The method as claimed in claim 29 wherein a time interval between link path integrity messages is determined by an administration function that supplies a value representative of a length of the interval.

31. The method as claimed in claim 29 wherein the link path integrity monitoring is performed by a link path monitoring machine, and there is an instance of the link path monitoring machine at each port of the DCRR.

32. The method as claimed in claim 28 wherein the link path integrity messages are stripped on the downstream end of the monitored link.

33. The method as claimed in claim 28 wherein the step of discovering is performed by a topology discovery machine (TDM) that operates under control of a reconfiguration machine (RM) and the TDM discovers the active topology of the DCRR and communicates the active topology to the RM.

34. The method as claimed in claim 33 wherein the RM instructs the TDM to begin a topology discovery process on receipt of a link failure message or a link recovery message, and the TDM reports a topology of the DCRR to the RM when the link topology discovery procedure is completed, the topology reported being one of: a ring topology and a linear topology.

35. The method as claimed in claim 34 wherein the RM instructs the TDM to reinitiate the topology discovery procedure when the RM receives a link failure message or a link recovery message before an end of the topology discovery procedure.

36. The method as claimed in claim 34 wherein the RM instructs the forwarding and learning process of the topology of the DCRR when the topology discovery procedure is completed.

37. The method as claimed in claim 34 wherein the RM signals to add path queue control logic on transition from one topology to another that a DCRR reconfiguration is in process and all frames that have been queued at either port must be discarded to avoid frame misordering.

38. The method as claimed in claim 34 wherein the RM signals a payload data enable condition to add path and drop path controllers when the RM is in the ring of the linear topology, and when not enabled the controllers discard all frames that arrive to be added or dropped.

39. The method as claimed in claim 34 wherein the RM signals a tandem path controller when the RM is not in a link breaking or link repairing state and when not enabled the tandem path controller discards all frames arriving for tandeming, the enable signal being sampled frame synchronously.

40. The method as claimed in claim 34 wherein the topology discovery procedure comprises the steps of:
   a) requesting a transmit PDU insertion machine at each DCRR port to transmit a topology discovery message;
   b) entering a wait state to wait for a return of a first topology discovery message originated by the topology discovery machine;
   c) entering a second wait state on receipt of a first topology discovery message to wait for receipt of a second topology discovery message sent by the topology discovery machine; and
   d) entering an idle state after receiving the first and second messages and informing the RM of the topology of the DCRR, or
   e) entering the idle state after waiting a predetermined time for receipt of the first and second messages and informing the RM of the topology of the DCRR.

41. A method of enabling shortest-path route forwarding of payload data across a communication network comprising two or more access points connected by dual-path links, comprises a pair of link paths adapted to carry payload traffic in a direction opposite that of the other link path, each access point having a pair of WAN ports adapted doe connection to respective dual path links, the method comprising the steps of:
   a) discovering a topology of the communication network in response to detection of a change in the topology of the communication network and in respect of a dual path link connecting first and second access point transmitting a first link path integrity monitor message from the first access point to the second access point over a first link path of the dual path link;
   detecting, at the second access point, an integrity of the first link path on the basis of reception of the first link path integrity monitor message;
   transmitting a second link path integrity monitor message from the second access point to the first access point over a second link path of the dual path link; and
   detecting, at the first access point, an integrity of the second link path on the basis of reception of the second link path integrity monitor message;
   b) learning addresses of destination devices subtended from the communication network;
   c) determining a path offering a shortest route, in terms of the number of hops to each learned address; and
   d) enabling a frame forwarding process to forward payload data across the communication network via the determined path offering the shortest route.

42. The method as claimed in claim 41, wherein the step of discovering a topology of the communication network comprises transmitting a topology discovery message over a selected WAN port to an access point, and waiting a predetermined interval for reception of the transmitted topology discovery message at the other WAN port of the access point.

43. The method as claimed in claim 42, wherein the topology of the communication network is discovered to be a ring topology if the transmitted topology discovery message is received within the predetermined interval, and a linear topology if the transmitted topology discovery message is not received within the predetermined interval.

44. The method as claimed in claim 41, wherein the second link path integrity monitor message includes a detected status of the first link path, and the first link path integrity monitor message includes a detected status of the second link path, whereby the first and second access points are informed of the status of a respective downstream link paths.

45. The method as claimed in claim 41, further comprising, when the status of either link path of the dual path link is detected to be in a link failure state, transmitting a link fail message from each of the first and second access points in respective directions away from the dual path link.

46. The method as claimed in claim 45, further comprising, when the status of either link path of the dual path link is determined to change from a link failure state to a link operational state, transmitting a link recovery message from each of the first and second access points in respective directions away from the dual path link.

47. The method as claimed in claim 41, wherein the step of learning addresses comprises the steps of, at each access point:
   a) extracting a source address of a payload data frame received at a WAN port of the access point; and
   b) maintaining an address cache including data of the source address.

48. The method as claimed in claim 47, further comprising the step of, when the source address of a received payload data frame is not recorded in the address cache, adding data of the source address to the address cache.

49. The method as claimed in claim 48, further comprising the step of flushing the address cache in the event of a detected change in the topology of the communication network.

50. The method as claimed in claim 49, wherein the step of detecting a path offering a shortest route comprises the step of, at each access point:
   a) determining a distance, in hops, from a source address of a payload data frame received at a WAN port of the access point; and
   b) maintaining an address cache including data of the source address, distance in hops, and WAN port on which the payload data frame was received.

51. The method as claimed in claim 50, further comprising the steps of, in respect of each source recorded in the address cache:
   a) determining whether the distance in hopes of a received payload data frame is less than the distance recorded in the address cache; and
   b) if the distance in hops of the received payload data frame is less than the distance recorded in the address cache, updating the address cache with data of the distance in hops, and the WAN port on which the payload data payload data frame was received.

52. The method as claimed in claim 51, further comprising the step of flushing the address cache in the event of a detected change in the topology of the communication network.

53. The method as claimed in claim 52, wherein each payload data frame includes a time to live (TTL) value, and wherein determination of the distance in hops to a source address comprises the steps of:
   a) setting the TTL to a predetermined value at a source access point;
   b) determining the TTL at each access point intermediate the source access point and a destination access point; and
   c) calculating, at the destination access point, the distance in hops based on a difference between the predetermined value and an actual value of the TTL of the received payload data frame.

* * * * *